(12) United States Patent
Abedini et al.

(10) Patent No.: US 11,706,811 B2
(45) Date of Patent: Jul. 18, 2023

(54) NEGOTIATING RANDOM ACCESS CHANNEL CONFIGURATIONS IN AN INTEGRATED ACCESS AND BACKHAUL NETWORK

(71) Applicant: QUALCOMM Incorporated, San Diego, CA (US)

(72) Inventors: Navid Abedini, Basking Ridge, NJ (US); Tao Luo, San Diego, CA (US); Qian Zhang, Basking Ridge, NJ (US); Kapil Gulati, Belle Mead, NJ (US); Junyi Li, Franklin Park, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/216,405

(22) Filed: Mar. 29, 2021

(65) Prior Publication Data

US 2022/0312488 A1    Sep. 29, 2022

(51) Int. Cl.
*H04W 74/08* (2009.01)
*H04W 92/12* (2009.01)

(52) U.S. Cl.
CPC ........ *H04W 74/0833* (2013.01); *H04W 92/12* (2013.01)

(58) Field of Classification Search
None
See application file for complete search history.

(56) References Cited

U.S. PATENT DOCUMENTS

| 10,341,959 | B2* | 7/2019 | Islam | H04W 74/0833 |
|---|---|---|---|---|
| 10,531,508 | B2* | 1/2020 | Wu | H04W 56/0015 |
| 2017/0318541 | A1* | 11/2017 | Islam | H04B 7/0695 |
| 2019/0045567 | A1* | 2/2019 | Wu | H04B 7/0626 |
| 2019/0306895 | A1* | 10/2019 | Kasparick | H04W 88/02 |
| 2020/0413451 | A1* | 12/2020 | Taherzadeh Boroujeni | H04W 74/0833 |
| 2022/0124817 | A1* | 4/2022 | Byun | H04W 24/02 |
| 2022/0312488 | A1* | 9/2022 | Abedini | H04W 74/0833 |

* cited by examiner

*Primary Examiner* — Faiyazkhan Ghafoerkhan
(74) *Attorney, Agent, or Firm* — Harrity & Harrity LLP / Qualcomm

(57) ABSTRACT

Various aspects of the present disclosure generally relate to wireless communication. In some aspects, a first wireless node may receive an indication of a configuration of one or more communication links associated with an enhanced duplex mode of at least one of the first wireless node or a second wireless node. The first wireless node may receive an indication of a random access channel (RACH) configuration associated with the second wireless node. The first wireless node may transmit a request to modify the RACH configuration, where the request to modify the RACH configuration is based at least in part on the configuration of the one or more communication links and the RACH configuration. Numerous other aspects are provided.

30 Claims, 16 Drawing Sheets

NEGOTIATING RANDOM ACCESS CHANNEL CONFIGURATIONS IN AN INTEGRATED ACCESS AND BACKHAUL NETWORK

FIELD OF THE DISCLOSURE

Aspects of the present disclosure generally relate to wireless communication and specifically, to techniques and apparatuses for negotiating random access channel (RACH) configurations in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Some wireless communication systems may include a wireless backhaul network, sometimes referred to as an integrated access and backhaul (IAB) network. In an IAB network, at least one base station is an anchor base station, also referred to as an IAB donor. The IAB network also includes one or more non-anchor base stations, sometimes referred to as relay base stations or IAB nodes. An anchor base station may communicate with a core network via a wired backhaul link. A non-anchor base station may communicate directly or indirectly (for example, via one or more other non-anchor base stations) with the anchor base station via one or more wireless backhaul links to form a backhaul path to the core network for carrying backhaul traffic. Additionally, each of the anchor base stations and non-anchor base stations may communicate with one or more UEs via wireless access links carrying access traffic.

In some cases, a wireless node (for example, an IAB node) may operate in an enhanced duplex mode. Operating in an enhanced duplex mode enables the wireless node to concurrently communicate multiple signals (for example, over multiple communication links associated with the wireless node). For efficient communication in an enhanced duplex mode, a wireless node may be required to coordinate or configure communication parameters of the concurrent signals to reduce or mitigate interference caused by the concurrent signals. For example, one or more conditions may need to be satisfied for the wireless node to efficiently communicate concurrent signals in the enhanced duplex mode. In some cases, one (or multiple) of the concurrent signals may be associated with a random access channel (RACH) procedure. A RACH procedure may be associated with a RACH configuration that indicates a large quantity of parameters or resource allocations for the RACH procedure. As a result, when an enhanced duplex mode is associated with a RACH procedure, there may be a large quantity of communication parameters to consider or coordinate to ensure efficient communication in the enhanced duplex mode. This may increase a complexity associated with the enhanced duplex mode as there may be additional considerations for a wireless node to consider when coordinating or configuring concurrent signals that include at least one signal associated with a RACH procedure. Moreover, a failure to coordinate RACH configurations and communication configurations of other communication links of the wireless node may result in interference at the wireless node due to operating in the enhanced duplex mode.

SUMMARY

In some aspects, a first wireless node for wireless communication includes at least one processor and at least one memory communicatively coupled with the at least one processor and storing processor-readable code that, when executed by the at least one processor, is configured to cause the first wireless node to receive an indication of a configuration of one or more communication links associated with an enhanced duplex mode of at least one of the first wireless node or a second wireless node. The processor-readable code that, when executed by the at least one processor, is configured to cause the first wireless node to receive an indication of a random access channel (RACH) configuration associated with the second wireless node. The processor-readable code that, when executed by the at least one processor, is configured to cause the first wireless node to transmit a request to modify the RACH configuration, where the request to modify the RACH configuration is based at least in part on the configuration of the one or more communication links and the RACH configuration.

In some aspects, a first wireless node for wireless communication includes at least one processor and at least one memory communicatively coupled with the at least one processor and storing processor-readable code that, when executed by the at least one processor, is configured to cause the first wireless node to transmit an indication of a RACH configuration associated with the first wireless node. The processor-readable code that, when executed by the at least one processor, is configured to cause the first wireless node to receive a request to modify the RACH configuration, where the request to modify the RACH configuration is based at least in part on a configuration of one or more communication links associated with an enhanced duplex mode of at least one of the first wireless node or a second wireless node.

In some aspects, a method of wireless communication performed by a first wireless node includes receiving an indication of a configuration of one or more communication links associated with an enhanced duplex mode of at least one of the first wireless node or a second wireless node. In some aspects, the method includes receiving an indication of a RACH configuration associated with the second wireless node. In some aspects, the method includes transmitting a request to modify the RACH configuration, where the request to modify the RACH configuration is based at least in part on the configuration of the one or more communication links and the RACH configuration.

In some aspects, a method of wireless communication performed by a first wireless node includes transmitting an indication of a RACH configuration associated with the first wireless node. In some aspects, the method includes receiving a request to modify the RACH configuration, where the request to modify the RACH configuration is based at least in part on a configuration of one or more communication links associated with an enhanced duplex mode of at least one of the first wireless node or a second wireless node.

In some aspects, a non-transitory computer-readable medium storing a set of instructions for wireless communication includes one or more instructions that, when executed by one or more processors of a first wireless node, cause the first wireless node to receive an indication of a configuration of one or more communication links associated with an enhanced duplex mode of at least one of the first wireless node or a second wireless node. The one or more instructions, when executed by the one or more processors of the first wireless node, cause the first wireless node to receive an indication of a RACH configuration associated with the second wireless node. The one or more instructions, when executed by the one or more processors of the first wireless node, cause the first wireless node to transmit a request to modify the RACH configuration, where the request to modify the RACH configuration is based at least in part on the configuration of the one or more communication links and the RACH configuration.

In some aspects, a non-transitory computer-readable medium storing a set of instructions for wireless communication includes one or more instructions that, when executed by one or more processors of a first wireless node, cause the first wireless node to transmit an indication of a RACH configuration associated with the first wireless node. The one or more instructions, when executed by the one or more processors of the first wireless node, cause the first wireless node to receive a request to modify the RACH configuration, where the request to modify the RACH configuration is based at least in part on a configuration of one or more communication links associated with an enhanced duplex mode of at least one of the first wireless node or a second wireless node.

In some aspects, an apparatus for wireless communication includes means for receiving an indication of a configuration of one or more communication links associated with an enhanced duplex mode of at least one of the apparatus or a second apparatus. In some aspects, the apparatus includes means for receiving an indication of a RACH configuration associated with the second wireless node. In some aspects, the apparatus includes means for transmitting a request to modify the RACH configuration, where the request to modify the RACH configuration is based at least in part on the configuration of the one or more communication links and the RACH configuration.

In some aspects, an apparatus for wireless communication includes means for transmitting an indication of a RACH configuration associated with the apparatus. In some aspects, the apparatus includes means for receiving a request to modify the RACH configuration, where the request to modify the RACH configuration is based at least in part on a configuration of one or more communication links associated with an enhanced duplex mode of at least one of the apparatus or a second apparatus.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
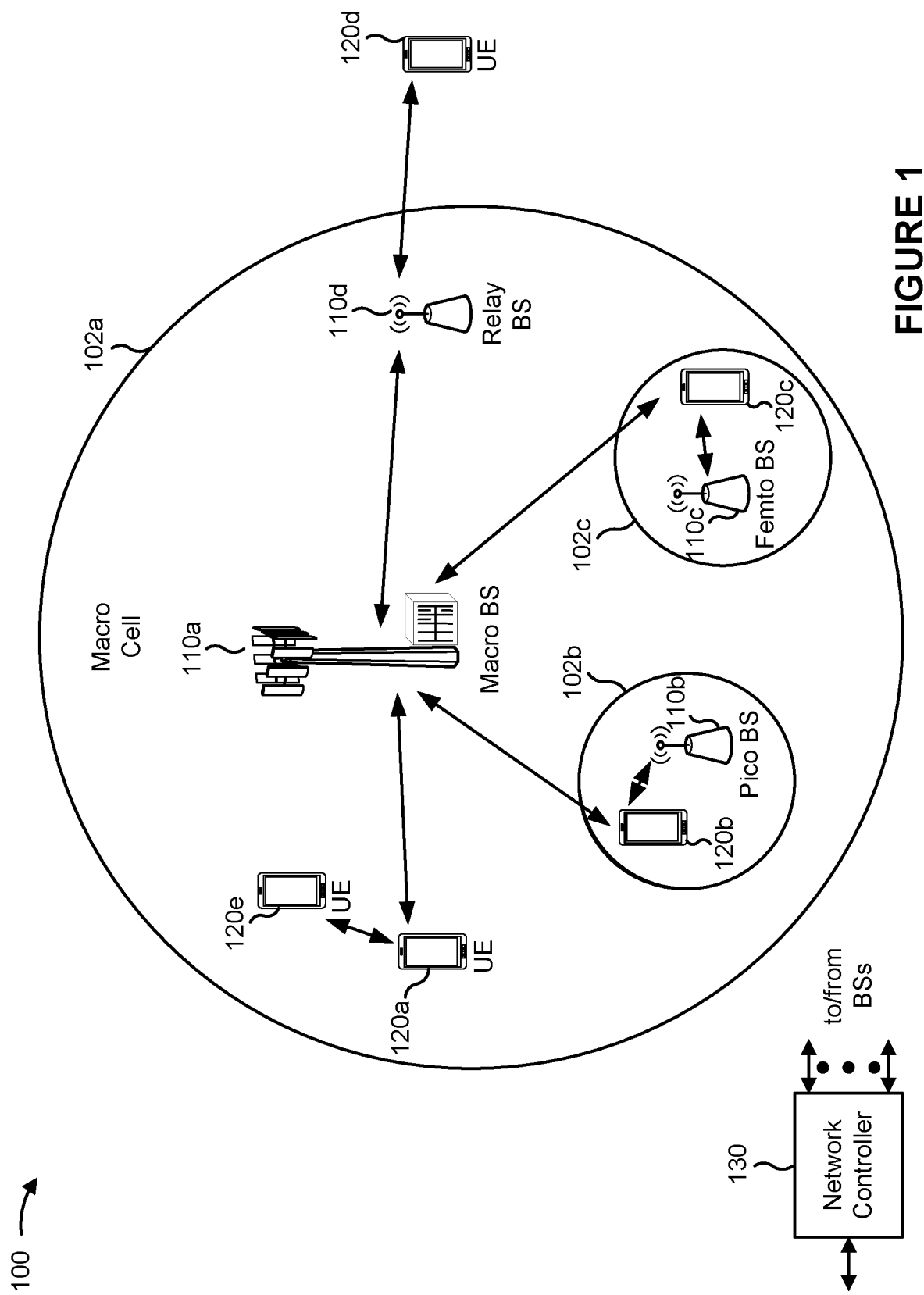
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to negotiating or determining random access channel (RACH) configurations in an integrated access and backhaul (IAB) network. Some aspects more specifically relate to negotiating RACH configurations for a wireless node (for example, an IAB node) operating in an enhanced duplex mode (for example, where the wireless node is capable of concurrently communicating multiple signals). In some aspects, the wireless node may receive a communication configuration (for example, a power configuration, a timing, or other communication parameters) of one or more links (for example, a parent link or a child link) associated with the wireless node. In some aspects, the wireless node may receive an indication of a RACH configuration associated with another wireless node (for example, a parent node or a child node). The wireless node may transmit (for example, to the parent node, the child node, or a central unit (CU) associated with the wireless node) a request to modify the RACH configuration associated with the other wireless node. The request to modify the RACH configuration may request or suggest a modification of a resource allocation (for example, a RACH occasion) or of one or more other parameters of the RACH configuration to improve communication (for example, to mitigate interference) for enhanced duplex communications that are associated with the RACH configuration of the other wireless node.

In some aspects, the request to modify the RACH configuration may be transmitted locally and directly to the other wireless node (for example, via a medium access control (MAC) control element (MAC-CE) message). In some other aspects, the request to modify the RACH configuration may be transmitted to a central unit (CU) associated with the wireless node and the other wireless node. The CU may forward (for example, transmit) the request to the other wireless node. In some aspects, the CU may modify the RACH configuration of the other wireless node (for example, based at least in part on the request) and may transmit an indication of a modified RACH configuration to the other wireless node.

Particular aspects of the subject matter described in this disclosure can be implemented to realize one or more of the following potential advantages. In some examples, the described techniques can be used to coordinate communication parameters in an enhanced duplex mode to support RACH procedures when a wireless node supports concurrent communications. In some examples, the described techniques can be used to reduce or mitigate interference caused by concurrent communications in an enhanced duplex mode when one or more (or all) of the concurrent communications are associated with a RACH procedure by enabling a wireless node to configure a RACH configuration based at least in part on communication configurations of simultaneous communications or by enabling the wireless node to request that a parent node or a child node modify a RACH configuration to improve communication performance in the enhanced duplex mode. In some examples, the described techniques can be used to reduce a complexity associated with coordinating communication parameters in the enhanced duplex mode by enabling the wireless node to receive communication configurations of links (for example, parent links or child links) associated with the wireless node and to modify (or request a modification of) a RACH configuration based at least in part on the communication configurations of links) associated with the wireless node.

FIG. 1 is a diagram illustrating an example of a wireless network in accordance with the present disclosure. The wireless network may be or may include elements of a 5G (NR) network or an LTE network, among other examples. The wireless network may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, such as macro BSs, pico BSs, femto BSs, or relay BSs. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces, such as a direct physical connection or a virtual network, using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay, among other examples.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components or memory components, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol or a vehicle-to-infrastructure (V2I) protocol), a mesh network, or a combination thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
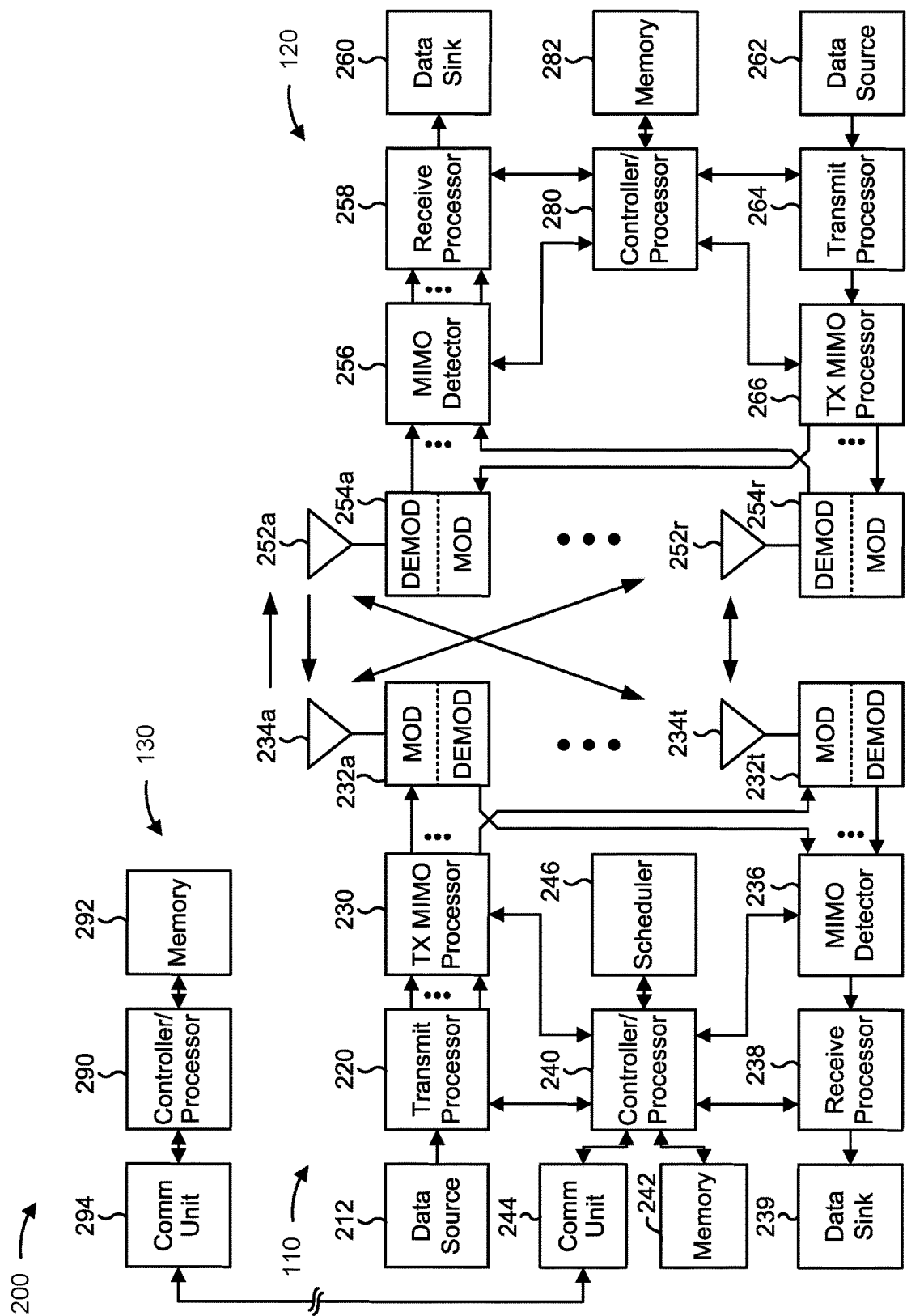
FIG. 2 is a diagram illustrating an example base station (BS) in communication with a user equipment (UE) in a wireless network in accordance with the present disclosure.

FIG. 2 is a diagram illustrating an example base station in communication with a UE in a wireless network in accordance with the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination of one or more controllers and one or more processors. A channel processor may determine one or more of a reference signal received power (RSRP) parameter, a received signal strength indicator (RSSI) parameter, a reference signal received quality (RSRQ) parameter, or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (such as antennas 234a through 234t or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at UE 120, a transmit processor 264 may receive and process data from a data source 262 as well as control information (for example, for reports including RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM) or orthogonal frequency division multiplexing (OFDM) with a cyclic prefix (CP) (CP-OFDM)), and transmitted to base station 110. In some aspects, a modulator and a demodulator (for example, MOD/DEMOD 254) of the UE 120 may be included in a modem of the UE 120. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, a modulator and a demodulator (for example, MOD/DEMOD 232) of the base station 110 may be included in a modem of the base station 110. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with negotiating RACH configurations in an IAB network, as described in more detail elsewhere herein. In some aspects, the wireless node (for example, the first wireless node or the second wireless node) described herein is the base station 110, is included in the base station 110, or includes one or more components of the base station 110 shown in FIG. 2. In some other aspects, the wireless node (for example, the first wireless node or the second wireless node) described herein is the UE 120, is included in the UE 120, or includes one or more components of the UE 120 shown in FIG. 2.

Figure 13:
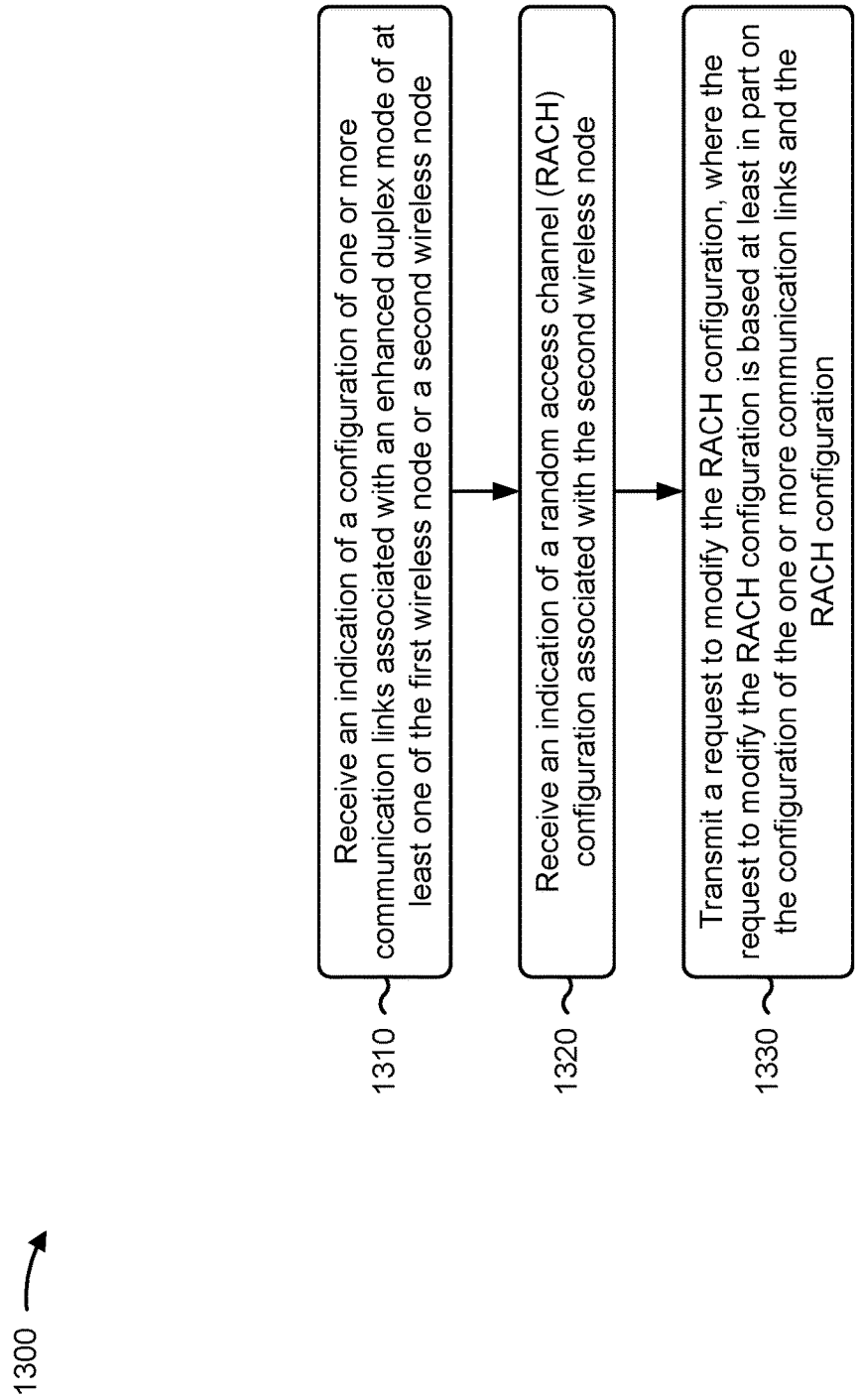
FIGS. 13 and 14 are flowcharts illustrating example processes performed, for example, by a wireless node that supports negotiating a RACH configuration in an TAB network, in accordance with the present disclosure.
Figure 14:
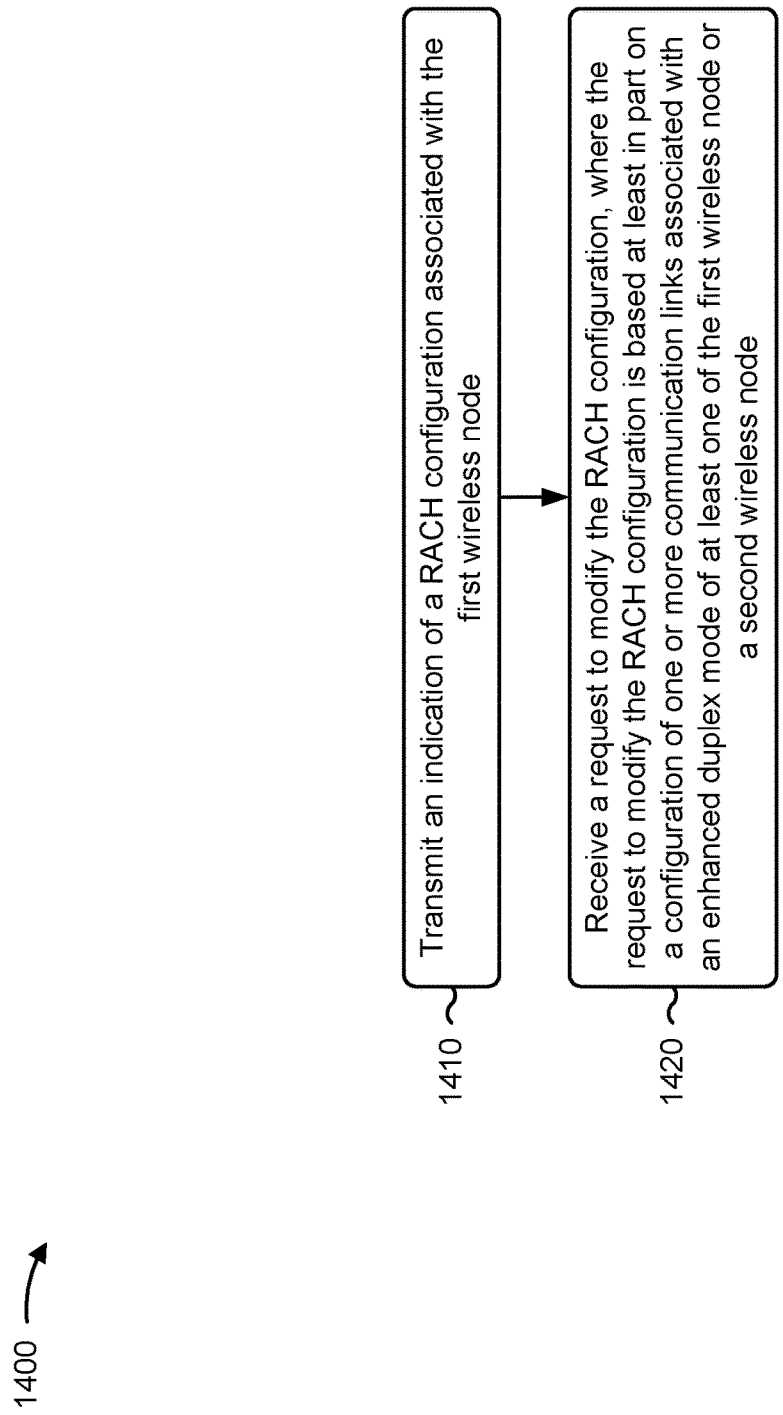

For example, controller/processor 240 of base station 110, controller/processor 280 of UE 120, or any other component(s) of FIG. 2 may perform or direct operations of, for example, process 1300 of FIG. 13, process 1400 of FIG. 14, or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1300 of FIG. 13, process 1400 of FIG. 14, or other processes as described herein. In some aspects, executing instructions may include running the instructions, converting the instructions, compiling the instructions, or interpreting the instructions, among other examples.

In some aspects, a first wireless node (for example, an IAB node, an IAB donor, or a base station 110) includes means for receiving an indication of a configuration of one or more communication links associated with an enhanced duplex mode of at least one of the first wireless node or a second wireless node; means for receiving an indication of a RACH configuration associated with the second wireless node; and/or means for transmitting a request to modify the RACH configuration, where the request to modify the RACH configuration is based at least in part on the configuration of the one or more communication links and the RACH configuration. In some aspects, the means for the first wireless node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some other aspects, the means for the first wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless node includes means for receiving, from a distributed unit (DU) of the parent node, an indication of a RACH configuration associated with the DU of the parent node. In some aspects, the first wireless node includes means for receiving, from a CU, an indication of a RACH configuration of a DU of the child node.

In some aspects, the first wireless node includes means for determining to request to modify the RACH configuration based at least in part on at least one of: a timing alignment associated with the configuration of the one or more communication links and the RACH configuration, a first beam configuration associated with the configuration of the one or more communication links, a second beam configuration associated with the RACH configuration, a first transmit power configuration associated with the configuration of the one or more communication links, a second transmit power configuration associated with the RACH configuration, or an interference level associated with at least one of the first wireless node or the second wireless node.

In some aspects, the first wireless node includes means for transmitting a request to modify at least one of: one or more time domain resource allocations associated with the RACH configuration, one or more frequency domain resource allocations associated with the RACH configuration, or one or more parameters associated with the RACH configuration.

In some aspects, the first wireless node includes means for transmitting, to the second wireless node, the request to modify the RACH configuration. In some aspects, the first wireless node includes means for transmitting the request to modify the RACH configuration to a mobile termination (MT) unit of the child node. In some aspects, the first wireless node includes means for transmitting the request to modify the RACH configuration to a DU of the parent node. In some aspects, the first wireless node includes means for transmitting the request to modify the RACH configuration via a MAC-CE message.

In some aspects, the first wireless node includes means for transmitting the request to modify the RACH configuration to a CU associated with the first wireless node and the second wireless node. In some aspects, the first wireless node includes means for transmitting the request to modify the RACH configuration via at least one of a radio resource control (RRC) message or an F1 application protocol (F1-AP) message.

In some aspects, the first wireless node includes means for transmitting an indication of a RACH configuration associated with the first wireless node; and/or means for receiving a request to modify the RACH configuration, where the request to modify the RACH configuration is based at least in part on a configuration of one or more communication links associated with an enhanced duplex mode of at least one of the first wireless node or a second wireless node. In some aspects, the means for the first wireless node to perform operations described herein may include, for example, one or more of transmit processor 220, TX MIMO processor 230, modulator 232, antenna 234, demodulator 232, MIMO detector 236, receive processor 238, controller/ processor 240, memory 242, or scheduler 246. In some aspects, the means for the first wireless node to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless node includes means for transmitting the indication of the RACH configuration to an MT unit of the second wireless node. In some aspects, the first wireless node includes means for transmitting the indication of the RACH configuration to a CU associated with the first wireless node and the second wireless node.

In some aspects, the first wireless node includes means for receiving a request to modify at least one of: one or more time domain resource allocations associated with the RACH configuration, one or more frequency domain resource allocations associated with the RACH configuration, or one or more parameters associated with the RACH configuration.

In some aspects, the first wireless node includes means for receiving, from the second wireless node, the request to modify the RACH configuration. In some aspects, the first wireless node includes means for receiving the request to modify the RACH configuration from an MT unit of a child node. In some aspects, the first wireless node includes means for receiving the request to modify the RACH configuration from a DU of a parent node. In some aspects, the first wireless node includes means for receiving the request to modify the RACH configuration via a MAC-CE message.

In some aspects, the first wireless node includes means for receiving the request to modify the RACH configuration from a CU associated with the first wireless node and the second wireless node. In some aspects, the first wireless node includes means for receiving, from a CU, an indication of a modified RACH configuration associated with the request to modify the RACH configuration.

Figure 3:
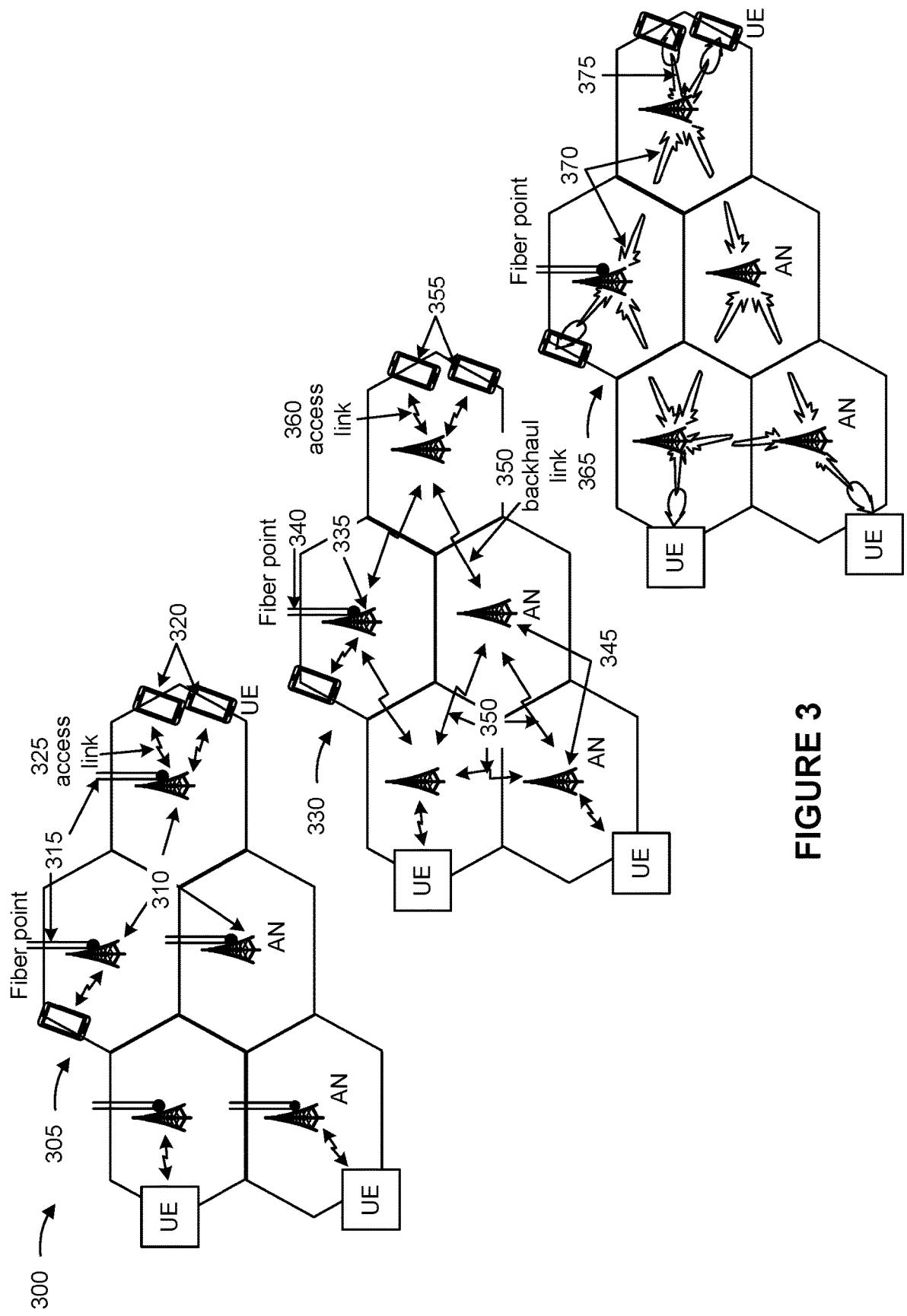
FIG. 3 is a diagram illustrating examples of radio access networks, in accordance with the present disclosure.

FIG. 3 is a diagram illustrating examples of radio access networks 300, in accordance with the present disclosure. A traditional (for example, 3G, 4G, or LTE) radio access network 305 may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some examples, a base station 310 shown in FIG. 3 may be a base station 110 shown in FIG. 1. In some examples, a UE 320 shown in FIG. 3 may be a UE 120 shown in FIG. 1.

A radio access network 330 may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (for example, via one or more non-anchor base stations 345) to form a backhaul path to the core network for carrying backhaul traffic. Backhaul link 350 may be a wireless link. Anchor base station(s) 335 or non anchor base station(s) 345 may communicate with one or more UEs 355 via access links 360, which may be wireless links for carrying access traffic. In some examples, an anchor base station 335 or a non-anchor base station 345 shown in FIG. 3 may be a base station 110 shown in FIG. 1. In some examples, a UE 355 shown in FIG. 3 may be a UE 120 shown in FIG. 1.

In some cases, a radio access network 365 that includes an IAB network may utilize millimeter wave technology or directional communications (for example, beamforming) for communications between base stations or UEs (for example, between two base stations, between two UEs, or between a base station and a UE). For example, wireless backhaul links 370 between base stations may use millimeter wave signals to carry information or may be directed toward a target base station using beamforming. Similarly, the wireless access links 375 between a UE and a base station may use millimeter wave signals or may be directed toward a target wireless node (for example, a UE or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (for example, a peer-to-peer network or a device-to-device network). In such examples, "anchor node" may refer to a UE that is directly in communication with a base station (for example, an anchor base station or a non-anchor base station).

Figure 4:
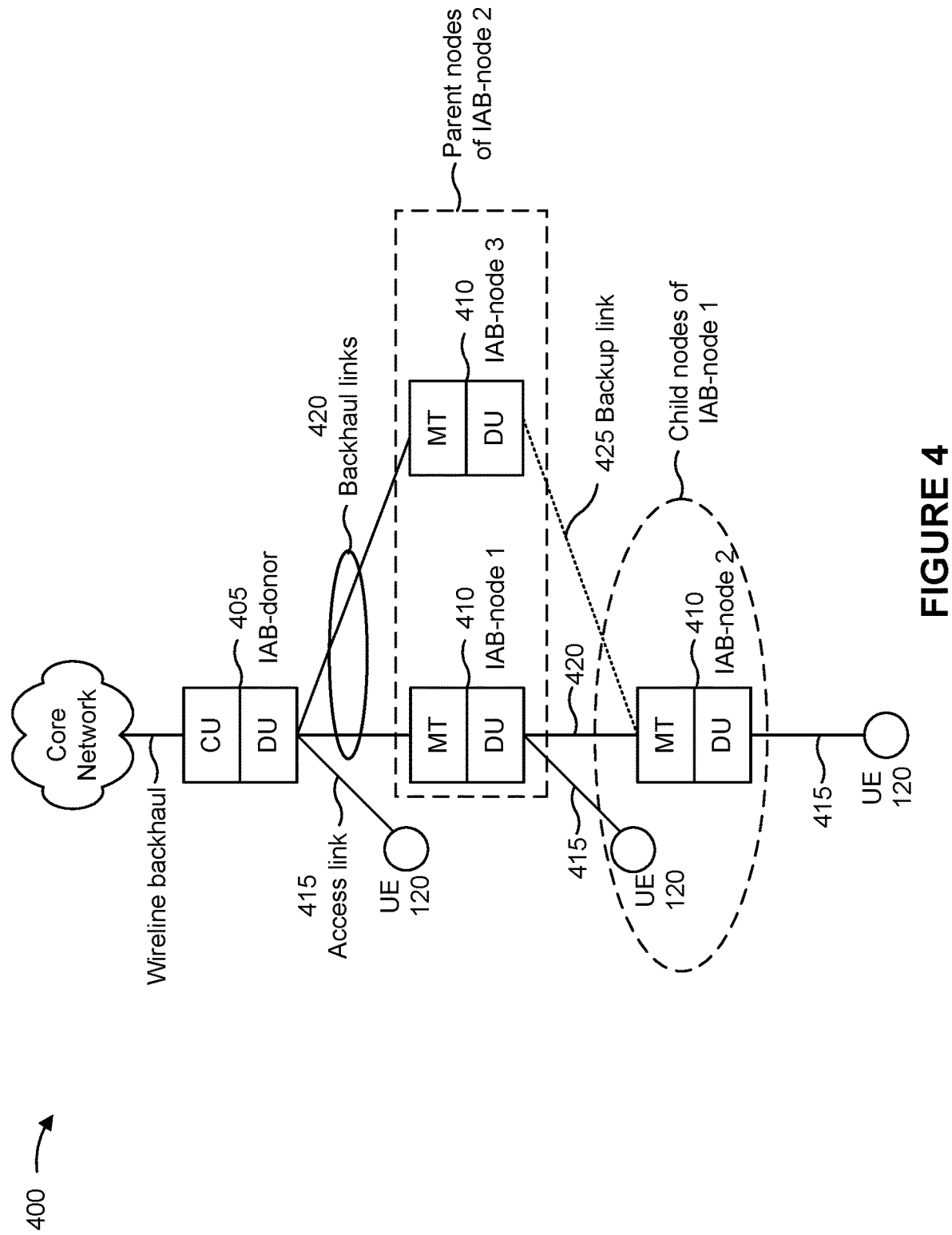
FIG. 4 is a diagram illustrating an example of an integrated access and backhaul (TAB) network architecture, in accordance with the present disclosure.

FIG. 4 is a diagram illustrating an example of an IAB network architecture 400, in accordance with the disclosure. As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally or alternatively, an IAB donor 405 may connect to one or more devices of the core network that provide a core access and mobility management function (AMF). In some cases, an IAB donor 405 may include a base station 110, such as an anchor base station, as described above in connection with FIG. 3. As shown, an IAB donor 405 may include a central unit (CU), which may perform access node controller (ANC) functions or AMF functions. The CU may configure a distributed unit (DU) of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message or an F1 application protocol (F1-AP) message).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEFs)) and may include DU functions (also sometimes referred to as access node functions (ANFs)). The MT functions of an IAB node 410 (for example, a child node) may be controlled or scheduled by another IAB node 410 (for example, a parent node of the child node) or by an IAB donor 405. The DU functions of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some examples, an IAB donor 405 may include DU functions and not MT functions. That is, an IAB donor 405 may configure, control, or schedule communications of IAB nodes 410 or UEs 120. A UE 120 may include only MT functions, and not DU functions. That is, communications of a UE 120 may be controlled or scheduled by an IAB donor 405 or an IAB node 410 (for example, a parent node of the UE 120).

When a first node controls or schedules communications for a second node (for example, when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control or schedule communications for child nodes of the parent node. A parent node may be an IAB donor 405 or an IAB node 410, and a child node may be an IAB node 410 or a UE 120. Communications of an MT function of a child node may be controlled or scheduled by a parent node of the child node.

As further shown in FIG. 4, a link between a UE 120 (for example, which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (for example, time resources, frequency resources, or spatial resources) may be shared between access links 415 and backhaul links 420. In some examples, a backhaul link 420 may be a primary backhaul link or a secondary backhaul link (for example, a backup backhaul link). In some examples, a secondary backhaul link may be used if a primary backhaul link fails, becomes congested, or becomes overloaded, among other examples. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

Figure 5:
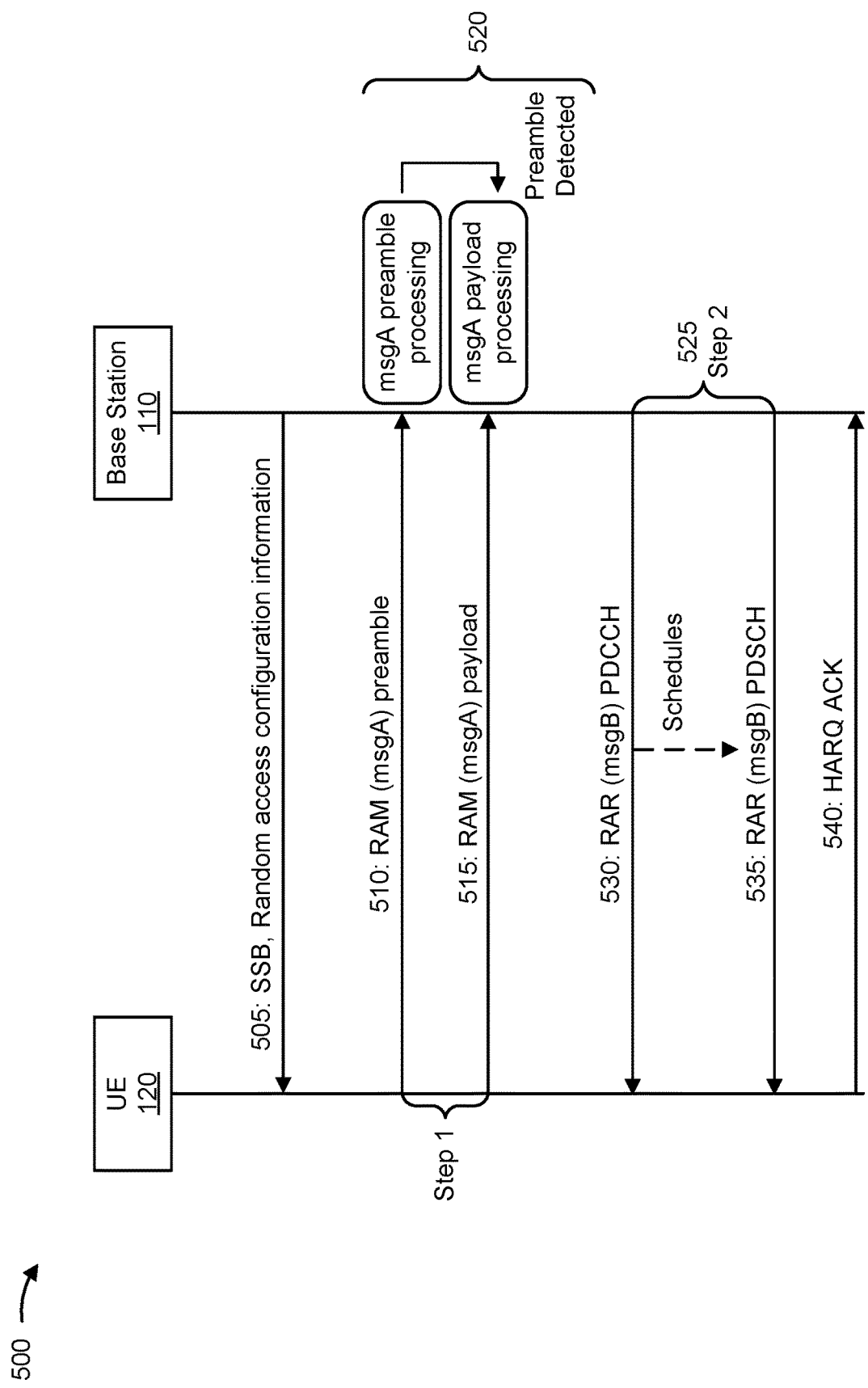
FIG. 5 is a diagram illustrating an example of a two-step random access procedure, in accordance with the present disclosure.

FIG. 5 is a diagram illustrating an example of a two-step random access procedure 500, in accordance with the present disclosure. As shown in FIG. 5, a base station 110 and a UE 120 may communicate with one another to perform the two-step random access procedure. As used herein, "random access procedure" may refer to a random access channel (RACH) procedure. In some examples, the base station 110 or the UE 120 may be a wireless node, such as an IAB node.

In a first operation 505, the base station 110 may transmit, and the UE 120 may receive, one or more synchronization signal blocks (SSBs) and random access configuration information. In some examples, the random access configuration information (for example, a RACH configuration) may be transmitted in or indicated by system information (for example, in one or more system information blocks (SIBs)) or an SSB, such as for contention-based random access. Additionally or alternatively, the random access configuration information may be transmitted in an RRC message or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) or receiving a random access response (RAR) to the RAM. For example, the RACH configuration may indicate one or more RACH occasions (for example, time domain and frequency domain resource allocations for the RACH message), a RACH preamble format, a subcarrier spacing, a quantity of cyclic shifts (for example, of a sequence of a RACH preamble), or a power configuration, among other examples.

In a second operation 510, the UE 120 may transmit, and the base station 110 may receive, a RAM preamble. In a third operation 515, the UE 120 may transmit, and the base station 110 may receive, a RAM payload. As shown, the UE 120 may transmit the RAM preamble and the RAM payload to the base station 110 as part of an initial (or first) step of the two-step random access procedure. In some examples, the RAM may be referred to as message A, msgA, a first message, or an initial message in a two-step random access procedure. Furthermore, in some examples, the RAM preamble may be referred to as a message A preamble, a msgA preamble, a preamble, or a physical random access channel (PRACH) preamble, and the RAM payload may be referred to as a message A payload, a msgA payload, or a payload. In some examples, the RAM may include some or all of the contents of message 1 (msg1) and message 3 (msg3) of a four-step random access procedure, which is described in more detail below. For example, the RAM preamble may include some or all contents of message 1 (for example, a PRACH preamble), and the RAM payload may include some or all contents of message 3 (such as a UE identifier, uplink control information (UCI), or a physical uplink shared channel (PUSCH) transmission).

In a fourth operation 520, the base station 110 may receive the RAM preamble transmitted by the UE 120. If the base station 110 successfully receives and decodes the RAM preamble, the base station 110 may then receive and decode the RAM payload.

In a fifth operation 525, the base station 110 may transmit an RAR (sometimes referred to as an RAR message). As shown, the base station 110 may transmit the RAR message as part of a second step of the two-step random access procedure. In some examples, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, or contention resolution information.

In a sixth operation 530, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (such as in downlink control information (DCI)) for the PDSCH communication.

In a seventh operation 535, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. In an eighth operation 540, if the UE 120 successfully receives the RAR, the UE 120 may transmit a hybrid automatic repeat request (HARD) acknowledgement (ACK).

Figure 6:
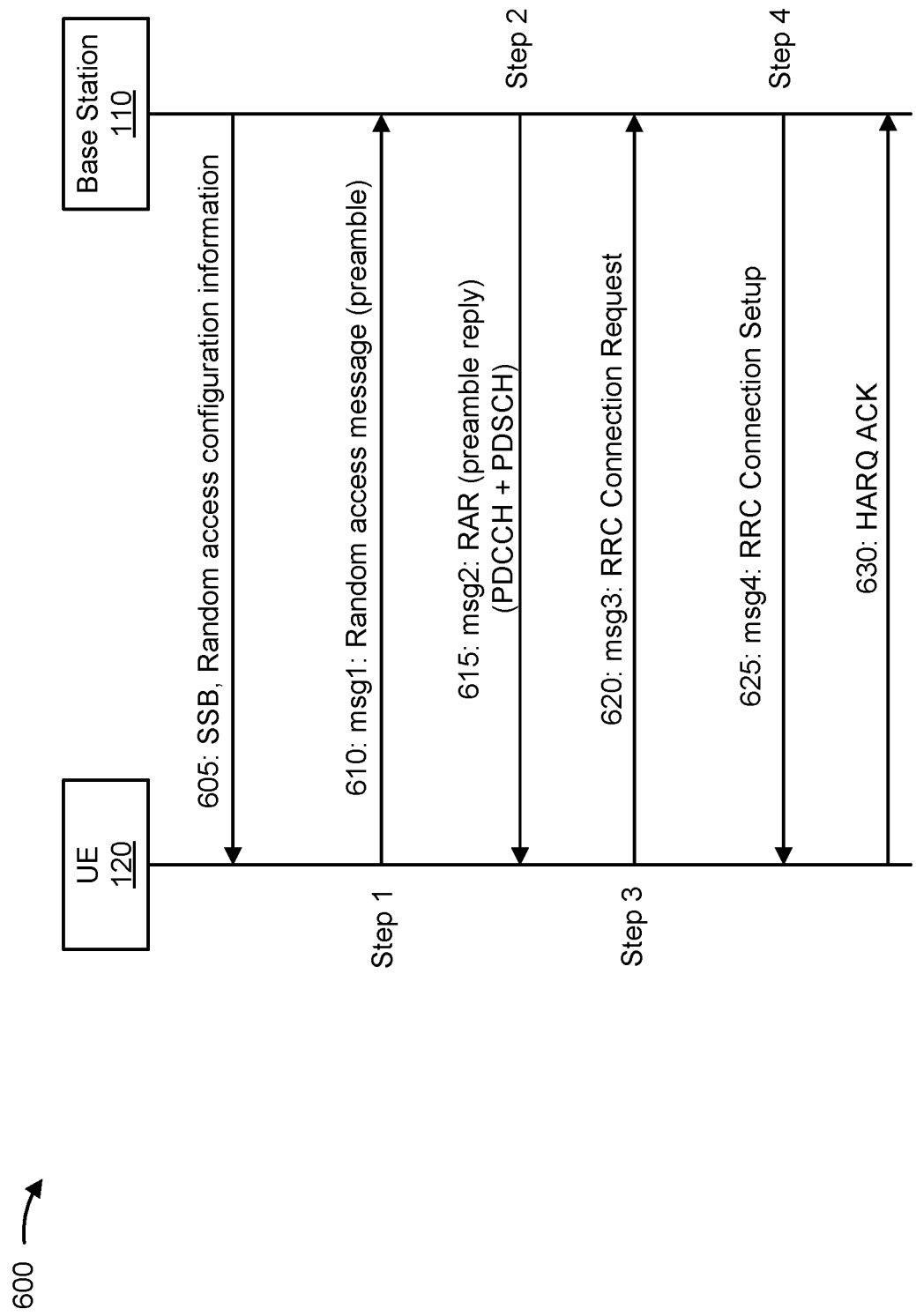
FIG. 6 is a diagram illustrating an example of a four-step random access procedure, in accordance with the present disclosure.

FIG. 6 is a diagram illustrating an example of a four-step random access procedure 600, in accordance with the present disclosure. As shown in FIG. 6, a base station 110 and a UE 120 may communicate with one another to perform the four-step random access procedure 600. In some examples, the base station 110 or the UE 120 may be a wireless node, such as an IAB node.

In a first operation 605, the base station 110 may transmit, and the UE 120 may receive, one or more SSBs and random access configuration information (for example, a RACH configuration). In some examples, the random access configuration information may be transmitted in or indicated by system information (such as in one or more SIBs) or an SSB, such as for contention-based random access. Additionally or alternatively, the random access configuration information may be transmitted in an RRC message or a PDCCH order message that triggers a RACH procedure, such as for contention-free random access. The random access configuration information may include one or more parameters to be used in the random access procedure, such as one or more parameters for transmitting a RAM or one or more parameters for receiving an RAR.

In a second operation 610, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

In a third operation 615, the base station 110 may transmit an RAR as a reply to the preamble. The message that includes the RAR may be referred to as message 2, msg2, MSG2, or a second message in a four-step random access procedure. In some examples, the RAR may indicate the detected random access preamble identifier (for example, received from the UE 120 in msg1). Additionally or alternatively, the RAR may indicate a resource allocation to be used by the UE 120 to transmit message 3 (msg3).

In some examples, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a MAC PDU of the PDSCH communication.

In a fourth operation 620, the UE 120 may transmit an RRC connection request message. The RRC connection request message may be referred to as message 3, msg3, MSG3, or a third message of a four-step random access procedure. In some examples, the RRC connection request may include a UE identifier, UCI, or a PUSCH communication (such as an RRC connection request).

In a fifth operation 625, the base station 110 may transmit an RRC connection setup message. The RRC connection setup message may be referred to as message 4, msg4, MSG4, or a fourth message of a four-step random access procedure. In some examples, the RRC connection setup message may include the detected UE identifier, a timing advance value, or contention resolution information. In a sixth operation 630, if the UE 120 successfully receives the RRC connection setup message, the UE 120 may transmit a HARQ ACK.

Figure 7:
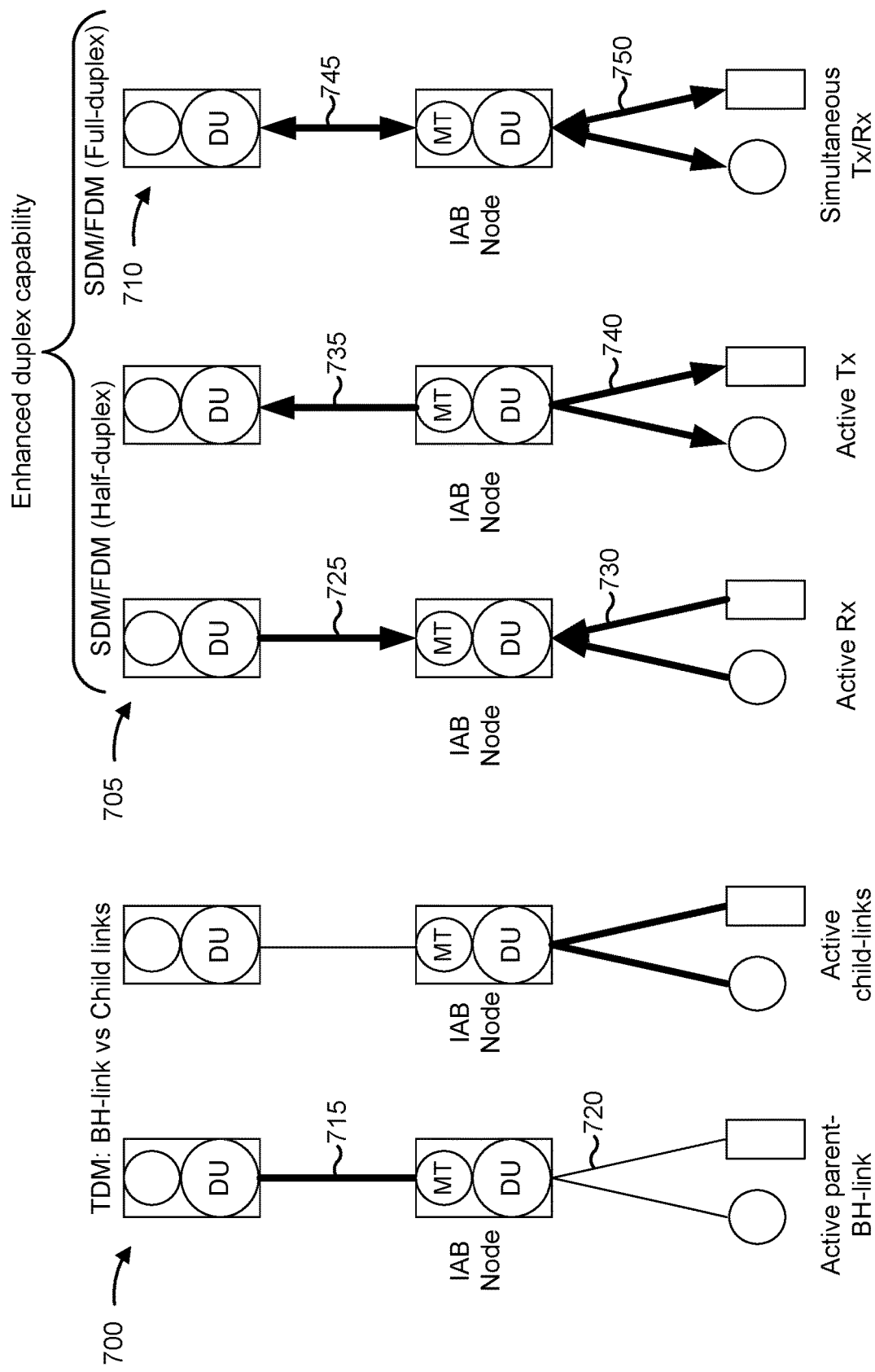
FIG. 7 is a diagram illustrating examples of communication capabilities for TAB nodes, in accordance with the present disclosure.

FIG. 7 is a diagram illustrating examples of communication capabilities 700, 705, and 710 for IAB nodes, in accordance with the present disclosure. As shown in FIG. 7, an IAB node with a first communication capability 700 is associated with a time division multiplexing (TDM) capability. An IAB node with a second communication capability 705 or a third communication capability 710 is associated with an enhanced duplex capability. A TDM capability, such as the first communication capability 700, may mean that the IAB node time division multiplexes communications on a parent link 715 (such as a backhaul (BH) link) with communications on child links 720 (such as an access link). As used herein, "parent link" may refer to a backhaul link or a link between an MT unit of the IAB node and another wireless node (such as a DU of an IAB node). "Child link" may refer to an access link or a link between a DU of the IAB node and another wireless node (such as an MT unit of an IAB node or a UE). For example, an IAB node associated with a TDM capability may not be capable of simultaneously communicating on a parent link 715 and a child link 720. Active communication on a link of FIG. 7 is illustrated by a thicker line, such as on the parent link 715, and non-active communication on a link is illustrated by a thinner line, such as the on the child link 720.

In contrast, an IAB node associated with an enhanced duplex capability, such as the second communication capability 705 or the third communication capability 710, is capable of simultaneously communicating on a parent link and a child link. For example, an IAB node with the second communication capability 705 may be capable of simultaneously performing reception on a parent link 725 and a child link 730 (as indicated by the arrows inbound to the IAB node on the parent link 725 and the child link 730), or simultaneously performing transmission on the parent link and the child link (as indicated by the arrows outbound from the IAB node on the parent link 735 and the child link 740). The duplexing configuration associated with the second communication capability 705 may be achieved by spatial division multiplexing (SDM) or frequency division multiplexing (FDM) in a half-duplex fashion.

As another example, an IAB node with the third communication capability 710 may be capable of full-duplex communication using SDM or FDM. For example, the IAB node may be capable of simultaneous transmission and reception on the parent link 745 and the child link 750. In some examples, a full-duplex capable IAB node may be capable of performing simultaneous transmission to a first node and reception from a second node. In some examples, a full-duplex capable IAB node may be capable of simultaneous transmission to a node and reception from the node. In some examples, a full-duplex capable IAB node may be capable of simultaneous transmission to and reception from a first node and transmission to and reception from a second node. As used herein, "enhanced duplex mode" or "enhanced duplexing mode" may refer to a wireless node (an IAB node) communicating using an enhanced duplex capability, such as the second communication capability 705 or the third communication capability 710.

In some examples, one or more of the enhanced duplex capabilities (associated with the second communication capability 705 or the third communication capability 710) of an IAB node may be conditional. For example, one or more conditions may need to be met or negotiated to efficiently communicate simultaneous communications in an enhanced duplex mode. For example, the one or more conditions may be associated with handling interference caused by the simultaneous communications. In some examples, the one or more conditions may be associated with a beam configuration of the IAB node. For example, one or more beams or one or more pairs of beams of the IAB node (for example, a beam pair that includes a transmit (Tx) beam and a receive (Rx) beam of the IAB node) may be capable of being used for an enhanced duplexed mode (such as for full duplex communication or for simultaneous communications). Similarly, one or more beams or one or more pairs of beams of the IAB node may not be capable of being used for an enhanced duplex mode. For example, the beams may be associated with a similar or close spatial direction or may share antenna elements (such as an antenna array) of the IAB node such that the beams are not suitable to be used for simultaneous communications.

In some other examples, the one or more conditions may be associated with a timing alignment between concurrent communications. As used herein, "concurrent communications" may refer to two or more communications that are communicated (transmitted or received) simultaneously, at substantially the same time, or at times that at least partially overlap, among other examples. For example, the concurrent communications may cause interference at the IAB node. Therefore, in order to perform interference mitigation or cancellation, the IAB node may attempt to align the concurrent communications in the time domain (for example, using an OFDM symbol boundary). By aligning the concurrent communications in the time domain, the IAB node may be enabled to mitigate or cancel the interference caused by the concurrent communications.

In some other examples, the one or more conditions may be associated with a power configuration of the concurrent communications. For example, the IAB node may need to apply power control to transmissions to avoid or mitigate self-interference (for example, self-interference caused by a transmission by the IAB node that interferes with a concurrent reception at the IAB node). In some other examples, the IAB node may need to balance multiple receive power levels or multiple transmit power levels of the concurrent communications in the enhanced duplex mode.

In some other examples, the one or more conditions may be associated with a guard band (for example, a minimum guard band) between the concurrent communications. For example, the IAB node may FDM the concurrent communications such that the IAB node transmits the concurrent communications at substantially the same time using different frequency resources (for example, using different sub-bands). The IAB node may configure a guard band (for example, one or more frequency resources, such as one or more resource blocks (RBs), that are not allocated for a signal) between the frequency resources for the concurrent communications. The guard band may be used to mitigate interference caused by the concurrent communications. For example, the one or more conditions may indicate a minimum guard band (for example, a minimum quantity of RBs) between concurrent signals to operate in the enhanced duplex mode.

Figure 8:
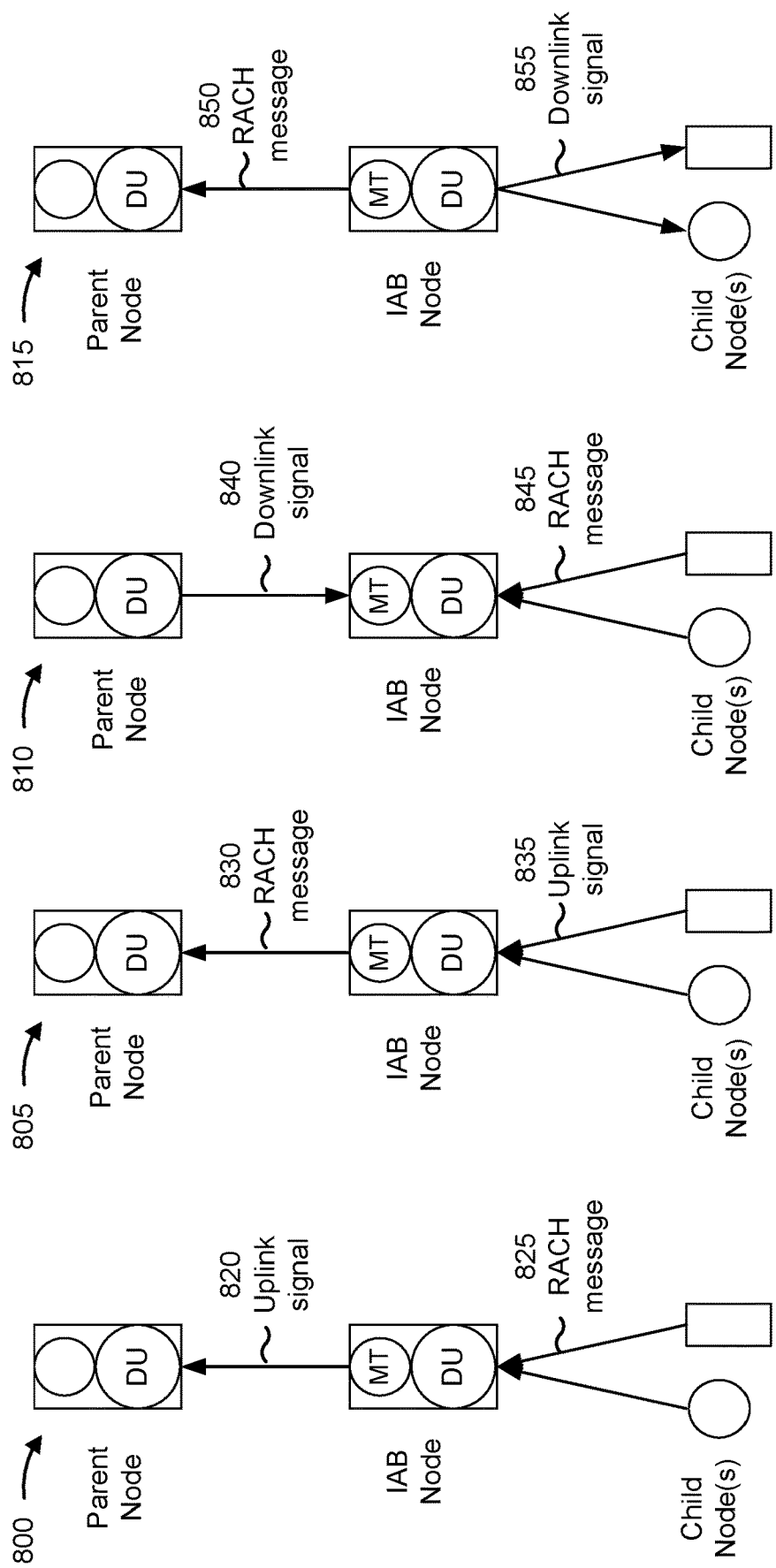
FIGS. 8A, 8B, 8C, and 8D are diagrams illustrating examples of random access channel (RACH) procedures for an TAB node operating in an enhanced duplex mode, in accordance with the present disclosure.

FIGS. 8A, 8B, 8C, and 8D are diagrams illustrating examples of RACH procedures 800, 805, 810 and 815 for an IAB node operating in an enhanced duplex mode, in accordance with the present disclosure. As shown in FIG. 8A, an IAB node may perform a RACH procedure 800 while operating in an enhanced duplex mode. For example, in a first operation 820, the IAB node (for example, an MT unit of the IAB node) may transmit an uplink signal (for example, to a DU of a parent node associated with the IAB node). The uplink signal (or the backhaul link between the IAB node and the parent node) may be associated with a communication configuration (for example, a power configuration, a timing configuration, a resource allocation, among other examples). In a second operation 825, the IAB node may receive, from a child node (for example, a UE or another IAB node), a RACH message (for example, a msgA, a msg1, or a msg3) at the same time as (or at a time that at least partially overlaps with) the transmission of the uplink signal. The RACH message may be associated with a RACH configuration of the IAB node (for example, a RACH resource allocation, a RACH preamble format, a subcarrier spacing, a quantity of cyclic shifts, or a power configuration, among other examples). In some examples, the uplink signal transmitted by the IAB node may be a RACH message (for example, a msgA, a msg1, or a msg3).

As shown in FIG. 8B, an IAB node may perform a RACH procedure 805 while operating in an enhanced duplex mode. For example, in a first operation 830, the IAB node (for example, an MT unit of the IAB node) may transmit a RACH message (for example, a msgA, a msg1, or a msg3) to a DU of a parent node associated with the IAB node. The RACH message may be associated with a RACH configuration of the parent node. In a second operation 835, the IAB node may receive, from a child node (for example, a UE or another IAB node), an uplink signal at the same time as (or at a time that at least partially overlaps with) the transmission of the RACH message. The uplink signal (or the access link between the IAB node and the child node) may be associated with a communication configuration.

As shown in FIG. 8C, an IAB node may perform a RACH procedure 810 while operating in an enhanced duplex mode. For example, in a first operation 840, the IAB node may receive, from a parent node (for example, from a DU of the parent node), a downlink signal. The downlink signal (or the backhaul link between the IAB node and the parent node) may be associated with a communication configuration. In some examples, the downlink signal may be an SSB signal (for example, associated with a RACH procedure). In a second operation 845, the IAB node may receive, from a child node, a RACH message (for example, a msgA, a msg1, or a msg3) at the same time as (or at a time that at least partially overlaps with) the reception of the downlink signal. The RACH message may be associated with a RACH configuration of the IAB node.

As shown in FIG. 8D, an IAB node may perform a RACH procedure 815 while operating in an enhanced duplex mode. For example, in a first operation 850, the IAB node (for example, an MT unit of the IAB node) may transmit a RACH message to a parent node (for example, a DU of the parent node). The RACH message may be associated with a RACH configuration of the parent node. In a second operation 855, the IAB node (for example, a DU of the IAB node) may transmit, to a child node, a downlink signal. The downlink signal (or the access link between the IAB node and the child node) may be associated with a communication configuration. In some examples, the downlink signal may be an SSB signal (for example, associated with a RACH procedure).

As described above, for efficient communication in an enhanced duplex mode, an IAB node may be required to coordinate or configure concurrent communications of the IAB node to reduce or mitigate interference caused by the concurrent communications. For example, the IAB node may coordinate or configure one or more beams or beam pairs that are suitable for concurrent communications. For example, beams or beam pairs may have sufficient spatial diversity or may use different antenna elements such that the beams or beam pairs are capable of being used for concurrent communications. As another example, the IAB node may coordinate or configure a timing alignment between the concurrent communications. For example, the IAB node may coordinate (for example, with a parent node or a child node) or may configure the concurrent communications to occur at substantially the same time to enhance a capability of the IAB node to mitigate or cancel interference caused by the concurrent communications. As another example, the IAB node may configure one or more guard bands (for example, one or more RBs) between frequency domain resource allocations of the concurrent communications to mitigate or reduce interference caused by the concurrent communications. As another example, the IAB node may coordinate (for example, with a parent node or a child node) or may configure a power configuration of the concurrent communications to mitigate or reduce interference caused by the concurrent communications. For example, the IAB node may reduce a transmit power of a communication that is to be transmitted by the IAB node to reduce a self-interference caused by the transmission (such as interference with a concurrent reception of a signal by the IAB node).

As described above, in some cases, one (or multiple) of the concurrent communications may be a RACH message. A RACH message may be associated with a RACH configuration that indicates a large quantity of parameters for the RACH message. For example, the RACH configuration may indicate RACH occasions (for example, time domain and frequency domain resource allocations for the RACH message). The RACH configuration may indicate multiple RACH occasions that are available to be used for the RACH message. The RACH configuration may indicate a RACH preamble format. The RACH preamble format may indicate a size or length of the RACH message, a size or length of a guard period of the RACH message, or a size of a cyclic prefix of the RACH message, among other examples. Parameters associated with different RACH preamble formats may be defined, or otherwise fixed, by a wireless communication standard, such as a 3GPP Specification. The RACH configuration may indicate a subcarrier spacing of the RACH message (for example, which may impact frequency domain resources used by the RACH message or a size of a cyclic prefix of the RACH message). The RACH configuration may indicate a quantity of cyclic shifts (for example, of a sequence of a RACH preamble) associated with the RACH message. The RACH configuration may indicate a power configuration for the RACH message. For example, the power configuration may indicate a target receive power level, or a power ramping step size value (for example, indicating a transmit power ramping step size for retransmissions of a RACH message), among other examples. In some examples, the power configuration may indicate a threshold value (for example, an RSRP value) for triggering a RACH selection (for example, a threshold value for an SSB to be selected by a node to be used for the RACH procedure).

As a result, when an enhanced duplex mode is associated with a RACH procedure (or a RACH message), there may be a large quantity of parameters to consider or coordinate to ensure efficient communication in the enhanced duplex mode. This may increase a complexity associated with the enhanced duplex mode as there are more considerations for an IAB node to consider when coordinating or configuring concurrent communications in the enhanced duplex mode. For example, a RACH resource allocation (for example, a RACH occasion) for the RACH message, a RACH preamble format for the RACH message, a subcarrier spacing for the RACH message, and a quantity of cyclic shifts of the RACH message may all impact timing alignment considerations for the IAB node. For example, if there is a large timing misalignment between a RACH message and another concurrent communication, then a larger cyclic prefix size, or a larger guard period for the RACH message, may be required to account for the timing misalignment. As another example, a target signal-to-noise ratio (SNR) or target signal-to-interference-plus-noise ratio (SINR) of the IAB node may impact a RACH configuration. For example, if the target SNR or the target SINR is a low value, then the RACH configuration may be required to configure a RACH preamble format with a larger size to enable the IAB node to meet the target SNR or the target SINR.

As another example, a power configuration of a RACH message may impact considerations for the IAB node in the enhanced duplex mode. For example, as interference may be present in the enhanced duplex mode, the RACH configuration may need to configure a sufficiently high transmit power (or a sufficiently high threshold value (for example, an RSRP value) for triggering a RACH selection) to ensure that RACH messages in the enhanced duplex mode can be successfully transmitted (for example, due to the presence of interference). As a result, the presence of a RACH message or a RACH configuration in an enhanced duplex mode introduces significant complexity and additional considerations for an IAB node operating in the enhanced duplex mode.

Various aspects relate generally to negotiating or determining RACH configurations in an IAB network. Some aspects more specifically relate to negotiating RACH configurations for a wireless node (for example, an IAB node) operating in an enhanced duplex mode. In some aspects, the wireless node may receive a communication configuration (for example, a power configuration, a timing, or other communication parameters) of one or more links (for example, a parent link or a child link) associated with the wireless node. The wireless node may modify or select a RACH configuration for the IAB node based at least in part on the communication configuration of one or more links associated with the wireless node. In some aspects, a CU associated with the wireless node may modify or select a RACH configuration for the IAB node based at least in part on the communication configuration of one or more links associated with the wireless node.

In some aspects, the wireless node may receive an indication of a RACH configuration associated with another wireless node (for example, a parent node or a child node). The wireless node may transmit (for example, to the parent node, the child node, or a CU associated with the wireless node) a request to modify the RACH configuration associated with the other wireless node. The request to modify the RACH configuration may request or suggest a modification of a resource allocation (for example, a RACH occasion) or of one or more other parameters of the RACH configuration to improve communication (for example, to mitigate interference) for enhanced duplex communications that are associated with the RACH configuration of the other wireless node. In some aspects, the request to modify the RACH configuration may be transmitted locally and directly to the other wireless node (for example, via a MAC-CE message). In some other aspects, the request to modify the RACH configuration may be transmitted to a CU associated with the wireless node and the other wireless node. The CU may forward (for example, transmit) the request to the other wireless node. In some aspects, the CU may modify the RACH configuration of the other wireless node (for example, based at least in part on the request) and may transmit an indication of a modified RACH configuration to the other wireless node.

Particular aspects of the subject matter described in this disclosure can be implemented to realize one or more of the following potential advantages. In some examples, the described techniques can be used to coordinate communication parameters in an enhanced duplex mode to support RACH procedures when a wireless node supports concurrent communications. In some examples, the described techniques can be used to reduce or mitigate interference caused by concurrent communications in an enhanced duplex mode when one or more (or all) of the concurrent communications are associated with a RACH procedure by enabling a wireless node to configure a RACH configuration based at least in part on communication configurations of simultaneous communications or by enabling the wireless node to request that a parent node or a child node modify a RACH configuration to improve communication performance in the enhanced duplex mode. In some examples, the described techniques can be used to reduce a complexity associated with coordinating communication parameters in the enhanced duplex mode by enabling the wireless node to receive communication configurations of links (for example, parent links or child links) associated with the wireless node and to modify (or request a modification of) a RACH configuration based at least in part on the communication configurations of links) associated with the wireless node.

Figure 9:
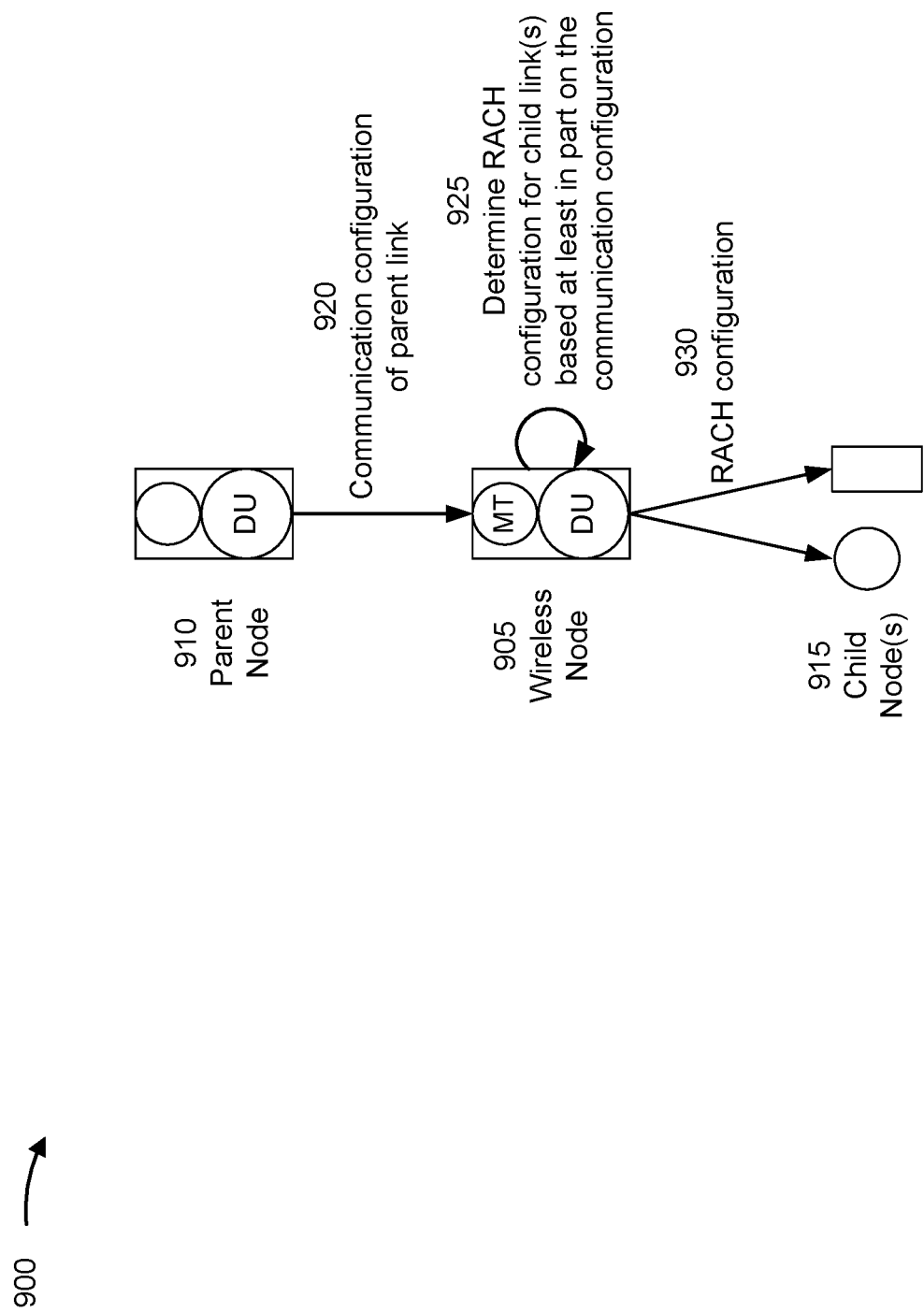
FIGS. 9, 10, 11, and 12 are diagrams illustrating examples associated with negotiating a RACH configuration in an TAB network, in accordance with the present disclosure.

FIG. 9 is a diagram illustrating an example of negotiating a RACH configuration in an IAB network 900, in accordance with the present disclosure. As shown in FIG. 9, a wireless node 905 may communicate with a parent node 910 and one or more child nodes 915. The wireless node 905 may be an IAB node, among other examples. The parent node 910 may be an IAB node or an IAB donor, among other examples. A child node 915 may be an IAB node or a UE, among other examples. The wireless node 905 may be operating in an enhanced duplex mode (for example, in a similar manner as described above with reference to FIGS. 7, 8A, 8B, 8C, and 8D). For example, the wireless node 905 may be capable of simultaneously communicating with the parent node 910 and a child node 915. FIG. 9 depicts an example associated with the wireless node 905 determining or modifying a RACH configuration of the wireless node 905 (for example, associated with a DU of the wireless node 905) based at least in part on a communication configuration of a link (for example, a backhaul link) with the parent node 910.

In a first operation 920, the wireless node 905 may receive or identify an indication of a communication configuration of a parent link (for example, a backhaul link) with the parent node 910. The communication configuration may indicate a power configuration for the parent link, a timing associated with the parent link (for example, one or more timing references), a beam configuration for the parent link (for example, one or more beams that are to be used for the parent link), a frame structure (for example, a frequency division duplexing (FDD) frame structure or a time division duplexing (TDD) frame structure), a resource allocation (for example, a resource allocation for one or more communications associated with the parent link), among other examples. In some aspects, the wireless node 905 may receive the communication configuration of the parent link in a SIB transmitted by the parent node 910 (or a CU associated with the parent node 910).

In some aspects, the communication configuration may be a RACH configuration (for example, associated with a DU of the parent node 910). For example, the communication configuration may indicate a resource allocation for the RACH configuration (such as one or more RACH occasions associated with the RACH configuration), or one or more parameters associated with the RACH configuration, among other examples. In some aspects, the communication configuration may indicate a configuration of SSBs to be transmitted by the parent node 910 using the parent link. For example, the communication configuration may indicate a synchronization communication hierarchy (for example, including a synchronization signal (SS) burst set, which may include a plurality of SS bursts where each SS burst includes one or more SSBs). In some aspects, different SSBs may be beam-formed differently by the parent node 910 (for example, may use different beams). An SS burst set may be periodically transmitted by the parent node 910.

In a second operation 925, the wireless node 905 may determine a RACH configuration (for example, a RACH configuration associated with the DU of the wireless node 905) for one or more child links between the wireless node 905 and the child node(s) 915. For example, the wireless node 905 may determine the RACH configuration based at least in part on the communication configuration of the parent link. In some aspects, the wireless node 905 may determine the RACH configuration to reduce or mitigate interference at the wireless node 905 (for example, associated with operating in the enhanced duplex mode).

For example, the wireless node 905 may determine a timing alignment for the RACH configuration based at least in part on a timing associated with the parent link (for example, to align messages associated with the RACH configuration with messages transmitted using the parent link to enable the wireless node to mitigate or reduce interference). For example, the wireless node 905 may select a RACH preamble format for the RACH configuration based at least in part on a timing alignment with the timing of the parent link. In some aspects, the wireless node 905 may determine a power configuration for the RACH configuration based at least in part on a power configuration of the parent link. For example, the wireless node 905 may select or determine a power configuration for the RACH configuration based at least in part on the power configuration of the parent link to mitigate or reduce self-interference experienced at the wireless node 905. In some aspects, the wireless node 905 may select or determine a beam configuration for the RACH configuration based at least in part on the beam configuration of the parent link. For example, as described above, the wireless node 905 may be associated with one or more beams that are capable of being used for the enhanced duplex mode (or one or more beams or beam pairs that are not capable of being used for the enhanced duplex mode). The wireless node 905 may select one or more beams (or beam pairs) for the RACH configuration based at least in part on one or more beams (or beam pairs) associated with the parent link to ensure that the wireless node 905 is configured to communicate using beams that are suitable for the enhanced duplex mode.

In a third operation 930, the wireless node 905 may transmit, to a child node 915, an indication of the RACH configuration (for example, determined by the wireless node 905 as described above). For example, the wireless node 905 may transmit the RACH configuration in a SIB. As a result, the RACH configuration used by the wireless node 905 and the child node 915 may be configured based at least in part on the communication configuration of the parent link. This improves a communication performance of the wireless node 905 operating in the enhanced duplex mode by ensuring that communication parameters (for example, associated with the RACH configuration) used by the wireless node 905 (for example, on the parent link and the child link) are coordinated to reduce or mitigate interference at the wireless node 905 (for example, caused by operating in the enhanced duplex mode as described elsewhere herein).

Figure 10:
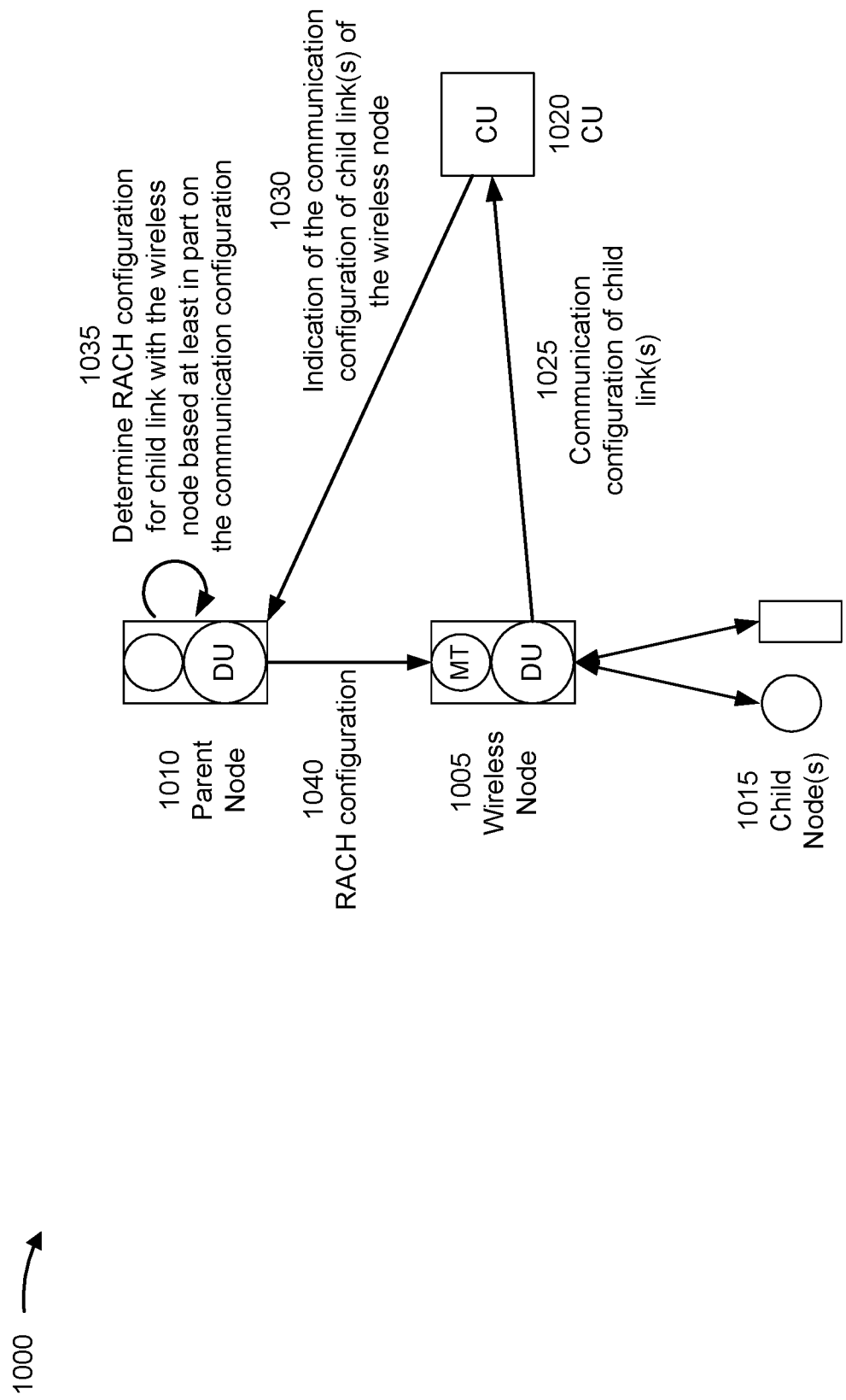

FIG. 10 is a diagram illustrating an example of negotiating a RACH configuration in an IAB network 1000, in accordance with the present disclosure. As shown in FIG. 10, a wireless node 1005 may communicate with a parent node 1010, one or more child nodes 1015, and a CU 1020. The wireless node 1005 may be an IAB node, among other examples. The parent node 1010 may be an IAB node or an IAB donor, among other examples. A child node 1015 may be an IAB node or a UE, among other examples. The wireless node 1005 may be operating in an enhanced duplex mode (for example, in a similar manner as described above with reference to FIGS. 7, 8A, 8B, 8C, and 8D). For example, the wireless node 1005 may be capable of simultaneously communicating with the parent node 1010 and a child node 1015. FIG. 10 depicts an example associated with the parent node 1010 determining or modifying a RACH configuration of the parent node 1010 (for example, associated with a DU of the parent node 1010) based at least in part on a communication configuration of a link associated with the wireless node 1005 (for example, a link between the wireless node 1005 and the child node 1015). For example, the parent node 1010 may determine or modify a RACH configuration of the parent node 1010 based at least in part on a communication configuration associated with a DU of the wireless node 1005.

In a first operation 1025, the wireless node 1005 may transmit, to the CU 1020, a communication configuration of one or more child links associated with the wireless node 1005 (for example, associated with the DU of the wireless node 1005). The communication configuration of the one or more child links may indicate similar information as the communication configuration of the parent link described above in connection with FIG. 9. For example, the communication configuration may indicate a power configuration for a child link, a timing associated with the child link (for example, one or more timing references), a beam configuration for the child link (for example, one or more beams that are to be used for the child link), a frame structure (for example, an FDD frame structure or a TDD frame structure), a resource allocation (for example, a resource allocation for one or more communications associated with the child link), among other examples.

In some aspects, the communication configuration may be a RACH configuration (for example, associated with a DU of the wireless node 1005). For example, the communication configuration may indicate a resource allocation for the RACH configuration (such as one or more RACH occasions associated with the RACH configuration), or one or more parameters associated with the RACH configuration, among other examples.

In some aspects, the communication configuration may indicate a resource type pattern associated with the child link. For example, in an IAB network, time domain resources may be configured as downlink-only, uplink-only, flexible, or not available (unavailable). Time resources in an IAB network that are configured as downlink-only, uplink-only, or flexible may be further configured as hard resources or soft resources. The communication configuration may indicate a TDD configuration that indicates a resource type pattern for the wireless node 1005 (for example, for the DU of the wireless node 1005). In some aspects, the communication configuration may indicate a configuration for other cell-specific signals, such as a configuration for SSBs to be transmitted by the wireless node 1005.

In a second operation 1030, the CU may transmit, to the parent node 1010, an indication of the communication configuration of the one or more child links associated with the wireless node 1005 (for example, associated with the DU of the wireless node 1005). For example, the CU may transmit the indication of the communication configuration in an RRC message or an F1-AP message.

In a third operation 1035, the parent node 1010 may determine a RACH configuration (for example, a RACH configuration associated with the DU of the parent node 1010) for links between the wireless node 1005 and the parent node 1010. For example, the parent node 1010 may determine the RACH configuration based at least in part on the communication configuration of the one or more child links associated with the wireless node 1005 (for example, based at least in part on the communication configuration associated with the DU of the wireless node 1005). In some aspects, the parent node 1010 may determine the RACH configuration to reduce or mitigate interference at the wireless node 1005 or the parent node 1010 (for example, associated with operating in the enhanced duplex mode).

For example, the parent node 1010 may determine a timing alignment for the RACH configuration based at least in part on a timing associated with DU of the wireless node 1005 (for example, to align messages associated with the RACH configuration with messages communicated by the DU of the wireless node 1005 using the child link to enable the wireless node 1005 to mitigate or reduce interference). For example, the parent node 1005 may select a RACH preamble format for the RACH configuration based at least in part on a timing alignment with the timing of the child link (for example, of the DU of the wireless node 1005).

In some aspects, the parent node 1010 may determine a power configuration for the RACH configuration based at least in part on a power configuration of the DU of the wireless node 1005. For example, the parent node 1010 may select or determine a power configuration for the RACH configuration based at least in part on the power configuration of the DU of the wireless node 1005 to mitigate or reduce self-interference experienced at the wireless node 1005. In some aspects, the parent node 1010 may select or determine a beam configuration for the RACH configuration based at least in part on the beam configuration of the DU of the wireless node 1005. For example, as described above, the wireless node 1005 may be associated with one or more beams that are capable of being used for the enhanced duplex mode (or one or more beams or beam pairs that are not capable of being used for the enhanced duplex mode). The parent node 1010 may select one or more beams (or beam pairs) for the RACH configuration based at least in part on one or more beams (or beam pairs) associated with the DU of the wireless node 1005 to ensure that the wireless node 1005 is configured to communicate using beams (or beam pairs) that are suitable for the enhanced duplex mode.

In a fourth operation 1040, the parent node 1010 may transmit, to the wireless node 1005, an indication of the RACH configuration (for example, determined by the parent node 1010 as described above). For example, the parent node 1010 may transmit the RACH configuration in a SIB. As a result, the RACH configuration used by the wireless node 1005 (for example, by an MT unit of the wireless node 1005) and the parent node 1010 may be configured based at least in part on the communication configuration of the DU of the wireless node 1005. This improves a communication performance of the wireless node 1005 operating in the enhanced duplex mode by ensuring that communication parameters (for example, associated with the RACH configuration) used by the wireless node 1005 (for example, on the parent link of the wireless node 1005 and the child link of the wireless node 1005) are coordinated to reduce or mitigate interference at the wireless node 1005 (for example, caused by operating in the enhanced duplex mode as described elsewhere herein).

Figure 11:
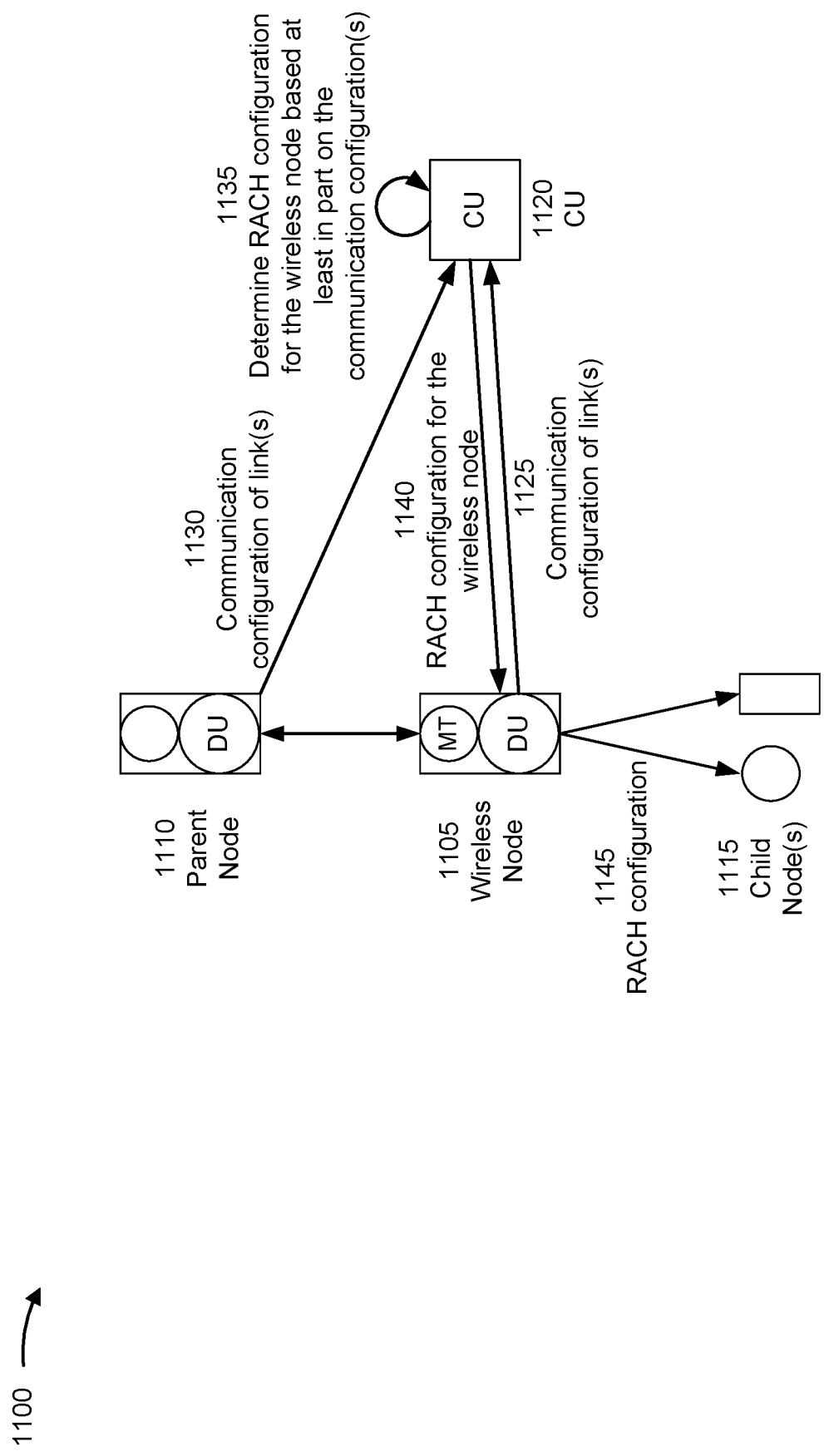

FIG. 11 is a diagram illustrating an example of negotiating a RACH configuration in an IAB network 1100, in accordance with the present disclosure. As shown in FIG. 11, a wireless node 1105 may communicate with a parent node 1110, one or more child nodes 1115, and a CU 1120. The wireless node 1105 may be an IAB node, among other examples. The parent node 1110 may be an IAB node or an IAB donor, among other examples. A child node 1115 may be an IAB node or a UE, among other examples. The wireless node 1105 may be operating in an enhanced duplex mode (for example, in a similar manner as described above with reference to FIGS. 7, 8A, 8B, 8C, and 8D). For example, the wireless node 1105 may be capable of simultaneously communicating with the parent node 1110 and a child node 1115. FIG. 11 depicts an example associated with the CU 1120 determining or modifying a RACH configuration of the wireless node 1105 (for example, associated with a DU of the wireless node 1105) based at least in part on one or more communication configurations of one or more links associated with the wireless node 1105 (for example, a link between the wireless node 1105 and the child node 1115 or between the wireless node 1105 and the child node 1115). For example, the CU 1120 may determine or modify a RACH configuration of the wireless node 1105 based at least in part on a communication configuration associated with a DU of the wireless node 1105 or associated with a DU of the parent node 1110, among other examples.

The CU 1120 may receive communication configurations from one or more other wireless nodes in the IAB network. For example, in a first operation 1125, the wireless node 1105 may transmit, to the CU 1120, a communication configuration of one or more links associated with the wireless node 1105 (for example, a communication configuration associated with a DU of the wireless node 1105). Similarly, in a second operation 1130, the parent node 1110 may transmit, to the CU 1120, a communication configuration of one or more links associated with the parent node 1110 (for example, a communication configuration associated with a DU of the parent node 1110). The communication configurations may be similar to the communication configurations described above with reference to FIGS. 9 and 10. For example, a communication configuration may indicate a RACH configuration or one or more other communication parameters, such as a power configuration parameter, a beam configuration parameter, or a timing parameter, among other examples. The CU 1120 may receive communication configurations associated with other wireless nodes in the IAB network in a similar manner.

In a third operation 1135, the CU 1120 may determine a RACH configuration for the wireless node 1105 based at least in part on at least one of the communication configurations received by the CU 1120. For example, the CU 1120 may determine the RACH configuration for the wireless node 1105 based at least in part on the communication configuration associated with the DU of the wireless node 1105, the communication configuration associated with the DU of the parent node 1110, or a communication configuration associated with the DU of child node 1115, among other examples. In some aspects, the CU 1120 may determine the RACH configuration to reduce or mitigate interference at the wireless node 1105 (for example, associated with operating in the enhanced duplex mode). For example, the CU 1120 may determine a timing alignment for the RACH configuration based at least in part on a timing associated with different communication configurations (for example, to align messages associated with the RACH configuration with other messages communicated by the wireless node 1105 to mitigate or reduce interference). For example, the CU 1120 may select a RACH preamble format for the RACH configuration based at least in part on a timing alignment (for example, between a parent link and a child link of the wireless node 1105).

In some aspects, the CU 1120 may determine a power configuration for the RACH configuration based at least in part on a power configuration of different links associated with the wireless node 1105. For example, the CU 1120 may select or determine a power configuration for the RACH configuration based at least in part on the power configuration of the DU of the wireless node 1105 and a power configuration of the DU of the parent node 1110 to mitigate or reduce self-interference experienced at the wireless node 1105. In some aspects, the CU 1120 may select or determine a beam configuration for the RACH configuration based at least in part on a beam configuration of the DU of the wireless node 1105 or a beam configuration of the DU of the parent node 1110. For example, as described above, the wireless node 1105 may be associated with one or more beams that are capable of being used for the enhanced duplex mode (or one or more beams or beam pairs that are not capable of being used for the enhanced duplex mode). The CU 1120 may select one or more beams (or beam pairs) for the RACH configuration based at least in part on one or more beams (or beam pairs) associated with the DU of the wireless node 1105 or the DU of the parent node 1110 to ensure that the wireless node 1105 is configured to communicate using beams (or beam pairs) that are suitable for the enhanced duplex mode.

In some aspects, the CU 1120 may determine the RACH configuration based at least in part on one or more measurement reports received by the CU 1120. For example, the CU 1120 may receive, from a wireless node in the IAB network (such as the wireless node 1105), a measurement report indicating an interference level measured by the wireless node 1105. The CU 1120 may determine the RACH configuration based at least in part on the interference level measured by the wireless node 1105. For example, if the wireless node 1105 is experiencing a high level of interference, then the CU 1120 may determine that the RACH configuration is to be associated with a high transmit power or a long RACH preamble format to ensure that RACH messages can be communicated with a high enough transmit power to overcome the high level of interference experienced by the wireless node 1105. The CU 1120 may determine a RACH configuration for other wireless nodes in the IAB network in a similar manner. For example, the CU 1120 may determine a RACH configuration for the parent node 1110 (for example, for the DU of the parent node 1110) in a similar manner as described herein.

In a fourth operation 1140, the CU 1120 may transmit, to the wireless node 1105, an indication of the RACH configuration (for example, determined by the CU 1120 as described above). For example, the CU 1120 may transmit the RACH configuration in a SIB or an RRC message, among other examples. In a fifth operation 1145, the wireless node 1105 may transmit (for example, broadcast in a SIB) an indication of the RACH configuration (for example, the RACH configuration indicated or configured by the CU 1120). As a result, the RACH configuration used by the wireless node 1105 (for example, by the DU of the wireless node 1105) may be configured based at least in part on the communication configuration of the DU of the wireless node 1105, the DU of the parent node 1110, or the DU of a child node 1115, among other examples. This improves a communication performance of the wireless node 1105 operating in the enhanced duplex mode by ensuring that communication parameters (for example, associated with the RACH configuration) used by the wireless node 1105 (for example, on the parent link of the wireless node 1105 and the child link of the wireless node 1105) are coordinated to reduce or mitigate interference at the wireless node 1105 (for example, caused by operating in the enhanced duplex mode as described elsewhere herein).

Figure 12:
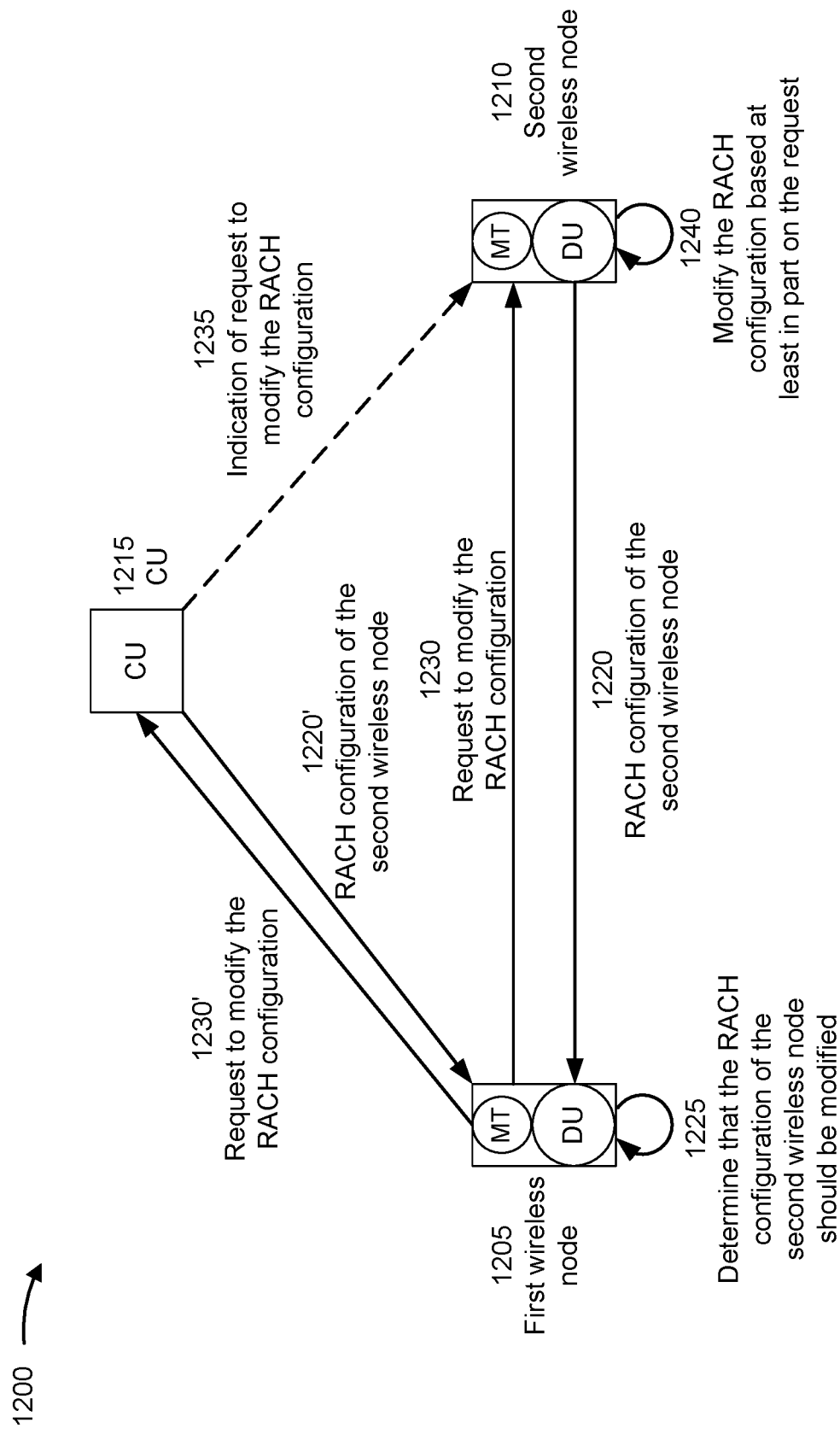

FIG. 12 is a diagram illustrating an example of negotiating a RACH configuration in an IAB network 1200, in accordance with the present disclosure. As shown in FIG.

12, a first wireless node 1205 may communicate with a second wireless node 1210 and a CU 1215. The first wireless node 1205 may be an IAB node or an IAB donor, among other examples. The second wireless node 1210 may be an IAB node, an IAB donor, or a UE, among other examples. In some examples, the second wireless node 1210 may be a child node associated with the first wireless node 1205 (for example, a DU of a child node associated with the first wireless node 1205). In some other examples, the second wireless node 1210 may be a parent node associated with the first wireless node 1205 (for example, a DU of a parent node associated with the first wireless node 1205).

FIG. 12 depicts an example in which the first wireless node 1205 requests, or indicates to, the second wireless node 1210 to change or modify a RACH configuration associated with the second wireless node 1210 (for example, associated with the DU of the second wireless node 1210). For example, the operations described above with reference to FIGS. 9, 10, and 11 may enable a RACH configuration for a first link of a wireless node to be selected or determined based at least in part on a communication configuration of a second link of the wireless node. However, the operations described above with reference to FIGS. 9, 10, and 11 may not allow for a negotiation or any flexibility in the selection or determination of the RACH configuration. Operations described herein with reference to FIG. 12 enable the first wireless node 1205 to coordinate or negotiate with the second wireless node 1210 to request or suggest a modification of the RACH configuration of the second wireless node 1210. For example, the first wireless node 1205 may request that the second wireless node 1210 change or modify a RACH configuration of the second wireless node 1210 based at least in part on a communication configuration of a link associated with the first wireless node 1205 or a communication configuration of a link associated with the second wireless node 1210.

For example, the first wireless node 1205 may receive an indication of a configuration of one or more communication links associated with an enhanced duplexing mode of the first wireless node 1205 or the second wireless node 1210. For example, the first wireless node may receive an indication of a communication configuration of a parent link (for example, between an MT unit of the first wireless node 1205 and another wireless node) of the first wireless node 1205 or a communication configuration of a child link (for example, between the DU of the first wireless node 1205 and another wireless node) of the first wireless node 1205. In some aspects, the first wireless node may receive an indication of a communication configuration of one or more links associated with the second wireless node 1210 (for example, a child link or a parent link associated with the second wireless node 1210). For example, the first wireless node may receive an indication of a communication configuration of one or more links associated with the second wireless node 1210 directly from the second wireless node 1210 or from the CU 1215. The communication configurations may indicate similar information as the communication configurations described above with reference to FIGS. 9, 10, and 11.

In a first operation 1220/1220', the first wireless node 1205 may receive an indication of a RACH configuration associated with the second wireless node 1210. For example, the first wireless node 1205 may receive, from the second wireless node 1210, the indication of the RACH configuration associated with the second wireless node 1210 in the first operation 1220 (for example, when the second wireless node 1210 is a parent node of the first wireless node 1205). For example, the second wireless node 1210 may transmit, and the first wireless node 1205 may receive, a SIB message indicating the RACH configuration associated with the second wireless node 1210.

In some other aspects, the first wireless node 1205 may receive, from the CU 1215, the indication of the RACH configuration associated with the second wireless node 1210 in the first operation 1220' (for example, when the second wireless node 1210 is a child node of the first wireless node 1205). For example, the second wireless node 1210 may transmit, and the CU 1215 may receive, an indication of the RACH configuration associated with the second wireless node 1210 (for example, in an RRC message or an F1-AP message). The CU 1215 may transmit, and the first wireless node 1205 may receive, the indication of the RACH configuration associated with the second wireless node 1210 (for example, in an RRC message or an F1-AP message). As described above, the RACH configuration of the second wireless node 1210 (for example, of the DU of the second wireless node 1210) may indicate one or more resource allocations (for example, RACH occasions) or one or more parameters associated with the RACH configuration, such as a power configuration parameter, a RACH preamble format, a subcarrier spacing, or a quantity of cyclic shifts, among other examples.

In a second operation 1225, the first wireless node 1205 may determine that the RACH configuration of the second wireless node 1210 should be modified. For example, the first wireless node 1205 may determine that the RACH configuration of the second wireless node 1210 should be modified in operation 1225 based at least in part on a timing alignment associated with the configuration of the one or more communication links and the RACH configuration. For example, the timing alignment may indicate that a timing of communication configuration of a link of the first wireless node 1205 and a timing of the RACH configuration (for example, of the second wireless node 1210) are misaligned. Therefore, the first wireless node 1205 may determine that the RACH configuration of the second wireless node 1210 should be modified to align the timing of communication configuration of the link of the first wireless node 1205 and the timing of the RACH configuration of the second wireless node 1210. For example, the first wireless node 1205 may determine that a subcarrier spacing, or a RACH preamble format, associated with the RACH configuration should be modified to improve the timing alignment.

In some aspects, the first wireless node 1205 may determine that the RACH configuration of the second wireless node 1210 should be modified in operation 1225 based at least in part on a required link budget or a target SNR or SINR of the first wireless node 1205. For example, the first wireless node 1205 may determine that the RACH configuration of the second wireless node 1210 should be modified to use a different RACH preamble format (for example, a longer preamble format or a shorter preamble format) based at least in part on the target SNR or the target SINR of the first wireless node 1205.

In some aspects, the first wireless node 1205 may determine that the RACH configuration of the second wireless node 1210 should be modified in operation 1225 based at least in part on a first beam configuration associated with the communication configuration of a link of the first wireless node 1205, or a second beam configuration associated with the RACH configuration of the second wireless node 1210. For example, the first wireless node 1205 may determine that the RACH configuration of the second wireless node 1210 should be modified to use acceptable or suitable beams or beam pairs (for example, acceptable or suitable beams or beam pairs for the first wireless node 1205 or for the second wireless node 1210) for the enhanced duplex mode, as described above.

In some aspects, the first wireless node 1205 may identify a first beam that is to be used for the link of the first wireless node 1205 and a second beam that is to be used for the RACH configuration of the second wireless node 1210. The first wireless node 1205 may determine that the first beam and the second beam may not be suitable for use in the enhanced duplex mode, may determine that the first beam and the second beam collide or have a similar spatial direction, or may determine that the first beam and the second beam share antenna elements (for example, an antenna array) of the first wireless node 1205. Therefore, the first wireless node 1205 may determine that the beam configuration of the RACH configuration should be modified in operation 1225 to use a different beam than the second beam (for example, to address one or more of the issues described above).

In some aspects, the first wireless node 1205 may determine that the RACH configuration of the second wireless node 1210 should be modified in operation 1225 based at least in part on a first transmit power configuration associated with the communication configuration of a link of the first wireless node 1205, or a second transmit power configuration associated with the RACH configuration of the second wireless node 1210. For example, the first wireless node 1205 may determine that a power associated with a communication on a link of the first wireless node 1205 and a power of the RACH configuration may cause interference at the first wireless node 1205. Therefore, the first wireless node 1205 may determine that the transmit power of the RACH configuration should be modified or reduced in operation 1225 to reduce or mitigate the interference at the first wireless node 1205.

In some aspects, the first wireless node 1205 may determine that the RACH configuration of the second wireless node 1210 should be modified in operation 1225 based at least in part on a first resource allocation for one or more signals associated with a link of the first wireless node 1205 and a second resource allocation associated with RACH configuration of the second wireless node 1210. For example, the first wireless node 1205 may determine that the first resource allocation and the second resource allocation conflict or collide with one another. In some aspects, the first wireless node 1205 may determine that the first resource allocation and the second resource allocation do not contain a minimum guard band (for example, between a frequency domain resource allocation of the first resource allocation and a frequency domain resource allocation of the second resource allocation). Therefore, the first wireless node 1205 may determine that the RACH configuration of the second wireless node 1210 should be modified in operation 1225 to use a different resource allocation or to add one or more guard bands, among other examples.

In some aspects, the first wireless node 1205 may determine that the RACH configuration of the second wireless node 1210 should be modified in operation 1225 based at least in part on an interference level associated with the first wireless node 1205 or the second wireless node 1210. In some aspects, the first wireless node 1205 may receive, from the second wireless node 1210, a measurement report indicating the interference level measured by the second wireless node 1210 (for example, when the second wireless node 1210 is a child node of the first wireless node 1205). The first wireless node 1205 may determine that a communication configuration of a link of the first wireless node 1205 and the RACH configuration of the second wireless node 1210 is causing, or will cause, interference at the first wireless node 1205 or at the second wireless node 1210 (for example, when the first wireless node 1205 or the second wireless node 1210 are operating in an enhanced duplex mode). Therefore, the first wireless node 1205 may determine that the RACH configuration of the second wireless node 1210 should be modified in operation 1225 (for example, modifying a power configuration, a resource allocation, a RACH preamble format, or another RACH parameter) to reduce or mitigate the interference level at the first wireless node 1205 or at the second wireless node 1210.

In some aspects, the first wireless node 1205 may determine that the RACH configuration of the second wireless node 1210 should be modified in operation 1225 based at least in part on receiving a request from the second wireless node 1210 to modify a communication configuration of the first wireless node 1205. For example, when the second wireless node 1210 is a child node of the first wireless node 1205, the second wireless node 1210 may request that the first wireless node 1205 modify a communication configuration of a link between the DU of the first wireless node 1205 and the MT unit of the second wireless node 1210. For example, the communication configuration of a link between the DU of the first wireless node 1205 and the MT unit of the second wireless node 1210 may conflict with the RACH configuration of the DU of the second wireless node 1210. Therefore, the second wireless node 1210 may transmit a request that the first wireless node 1205 modify the communication configuration of the link between the DU of the first wireless node 1205 and the MT unit of the second wireless node 1210. In response, the first wireless node 1205 may determine that the RACH configuration of the DU of the second wireless node 1210 should be modified in operation 1225 (for example, rather than the communication configuration of the link between the DU of the first wireless node 1205 and the MT unit of the second wireless node 1210).

As described above, the first wireless node 1205 may determine that the RACH configuration of the second wireless node 1210 should be modified in operation 1225 to modify one or more time domain resource allocations associated with the RACH configuration, one or more frequency domain resource allocations associated with the RACH configuration, or one or more parameters associated with the RACH configuration. For example, a parameter associated with the RACH configuration may include a RACH preamble format, a subcarrier spacing, a quantity of cyclic shifts, a target receive power level, a power ramping step value, a measurement threshold value associated with initiating a RACH procedure (for example, an RSRP threshold value of SSBs associated with the RACH procedure), a quantity of guard bands, or a size of the guard bands, among other examples. The first wireless node 1205 may configure the request in operation 1225 to indicate one or more modified time domain resource allocations associated with the RACH configuration, one or more modified frequency domain resource allocations associated with the RACH configuration, or one or more modified parameters associated with the RACH configuration, among other examples, to address one or more (or all) of the problems described above.

In a third operation 1230/1230', the first wireless node 1205 may transmit the request to modify the RACH configuration of the second wireless node 1210 (for example, determined by the first wireless node 1205 as described above). For example, the request to modify the RACH configuration of the second wireless node 1210 may indicate a request to modify one or more time domain resource allocations associated with the RACH configuration, one or more frequency domain resource allocations associated with the RACH configuration, or one or more parameters associated with the RACH configuration.

In some aspects, the first wireless node 1205 may transmit the request to modify the RACH configuration of the second wireless node 1210 in the third operation 1230 directly (and locally) to the second wireless node 1210. For example, the first wireless node 1205 may transmit the request to modify the RACH configuration to the second wireless node 1210 via a MAC-CE message. In some aspects, where the second wireless node 1210 is a child node of the first wireless node 1205, the first wireless node 1205 may transmit the request to modify the RACH configuration from the DU of the first wireless node 1205 to the MT unit of the second wireless node 1210 (for example, in a downlink signal). In some other aspects, where the second wireless node 1210 is a parent node of the first wireless node 1205, the first wireless node 1205 may transmit the request to modify the RACH configuration from the MT unit of the first wireless node 1205 to the DU of the second wireless node 1210 (for example, in an uplink signal).

In some other aspects, as shown in FIG. 12, the first wireless node 1205 may transmit the request to modify the RACH configuration of the second wireless node 1210 in the third operation 1230' via the CU 1215. For example, the first wireless node 1205 may transmit the request to modify the RACH configuration to the CU 1215 via an RRC message or an F1-AP message, among other examples. In a fourth operation 1235, the CU 1215 may transmit, to the second wireless node 1210, an indication of the request to modify the RACH configuration of the second wireless node 1210. For example, the CU 1215 may forward the request to modify the RACH configuration of the second wireless node 1210 from the first wireless node 1205 to the second wireless node 1210.

In some aspects, the CU 1215 may receive the request to modify the RACH configuration of the second wireless node 1210 from the first wireless node 1205 and may determine a modified RACH configuration for the second wireless node 1210. For example, the CU 1215 may determine the modified RACH configuration for the second wireless node 1210 based at least in part on the request received from the first wireless node 1205. The CU 1215 may determine the modified RACH configuration for the second wireless node 1210 in a similar manner as described above with reference to FIG. 11. Therefore, in some aspects, the indication of the request to modify the RACH configuration of the second wireless node 1210 (for example, transmitted by the CU 1215 to the second wireless node 1210) may indicate the modified RACH configuration for the second wireless node 1210.

In a fifth operation 1240, the second wireless node 1210 may modify the RACH configuration of the second wireless node 1210 (for example, of the DU of the second wireless node 1210) based at least in part on the request from the first wireless node 1205. For example, the second wireless node 1210 may modify one or more time domain resource allocations associated with the RACH configuration, one or more frequency domain resource allocations associated with the RACH configuration, or one or more parameters associated with the RACH configuration as indicated by the request. In some aspects, the second wireless node 1210 may transmit (for example, broadcast) an indication of the modified RACH configuration, such as in a SIB message, based at least in part on modifying the RACH configuration, as described above.

In some aspects, the second wireless node 1210 may determine whether the RACH configuration may be modified as requested by the first wireless node 1205. For example, the second wireless node 1210 may determine whether the modifications requested by the first wireless node 1205 satisfy a capability of the second wireless node 1210 or whether the modifications requested by the first wireless node 1205 cause a conflict with another communication link of the second wireless node 1210. If the second wireless node 1210 determines that the RACH configuration may be modified as requested by the first wireless node 1205, then the second wireless node 1210 may modify the RACH configuration, as described above. If the second wireless node 1210 determines that the RACH configuration may not be modified as requested by the first wireless node 1205, then the second wireless node 1210 may not modify the RACH configuration. In such examples, the second wireless node 1210 may transmit, to the first wireless node 1205 or the CU 1215, an indication that the RACH configuration cannot be modified as requested by the first wireless node 1205.

The first wireless node 1205 or the second wireless node 1210 may communicate, in an enhanced duplex mode, using the modified RACH configuration that is negotiated between the first wireless node 1205 and the second wireless node 1210 as described above. As a result, the first wireless node 1205 and the second wireless node 1210 may be enabled to coordinate or negotiate communication parameters in an enhanced duplex mode to support RACH procedures. This may reduce or mitigate interference caused by concurrent communications in an enhanced duplex mode when one or more (or all) of the concurrent communications are associated with a RACH procedure by enabling the wireless node to request that a parent node or a child node modify a RACH configuration to improve communication performance in the enhanced duplex mode.

FIG. 13 is a flowchart illustrating an example process 1300 performed, for example, by a first wireless node that supports negotiating a RACH configuration in an IAB network, in accordance with the present disclosure. Example process 1300 is an example where the first wireless node (for example, the first wireless node 1205) performs operations associated with negotiating RACH configurations in an IAB network.

As shown in FIG. 13, in some aspects, process 1300 may include receiving an indication of a configuration of one or more communication links associated with an enhanced duplex mode of at least one of the first wireless node or a second wireless node (block 1310). For example, the first wireless node (such as by using reception component 1502, depicted in FIG. 15) may receive an indication of a configuration of one or more communication links associated with an enhanced duplex mode of at least one of the first wireless node or a second wireless node, as described above.

As further shown in FIG. 13, in some aspects, process 1300 may include receiving an indication of a RACH configuration associated with the second wireless node (block 1320). For example, the first wireless node (such as by using reception component 1502, depicted in FIG. 15) may receive an indication of a RACH configuration associated with the second wireless node, as described above.

As further shown in FIG. 13, in some aspects, process 1300 may include transmitting a request to modify the RACH configuration, where the request to modify the RACH configuration is based at least in part on the configuration of the one or more communication links and the RACH configuration (block 1330). For example, the first wireless node (such as by using transmission component 1506, depicted in FIG. 15) may transmit a request to modify the RACH configuration, where the request to modify the RACH configuration is based at least in part on the configuration of the one or more communication links and the RACH configuration, as described above.

Process 1300 may include additional aspects, such as any single aspect or any combination of aspects described below or in connection with one or more other processes described elsewhere herein.

In a first additional aspect, the second wireless node is a DU of a parent node associated with the first wireless node. In a second additional aspect, alone or in combination with the first aspect, the second wireless node is a DU of a child node associated with the first wireless node.

In a third additional aspect, alone or in combination with one or more of the first and second aspects, the second wireless node is a parent node associated with the first wireless node, and receiving the indication of the RACH configuration includes receiving, from a DU of the parent node, an indication of a RACH configuration associated with the DU of the parent node.

In a fourth additional aspect, alone or in combination with one or more of the first through third aspects, the second wireless node is a child node associated with the first wireless node, and receiving the indication of the RACH configuration includes receiving, from a CU, an indication of a RACH configuration of a DU of the child node.

In a fifth additional aspect, alone or in combination with one or more of the first through fourth aspects, process 1300 includes determining to request to modify the RACH configuration based at least in part on at least one of: a timing alignment associated with the configuration of the one or more communication links and the RACH configuration, a first beam configuration associated with the configuration of the one or more communication links, a second beam configuration associated with the RACH configuration, a first transmit power configuration associated with the configuration of the one or more communication links, a second transmit power configuration associated with the RACH configuration, or an interference level associated with at least one of the first wireless node or the second wireless node.

In a sixth additional aspect, alone or in combination with one or more of the first through fifth aspects, transmitting the request to modify the RACH configuration includes transmitting a request to modify at least one of: one or more time domain resource allocations associated with the RACH configuration, one or more frequency domain resource allocations associated with the RACH configuration, or one or more parameters associated with the RACH configuration.

In a seventh additional aspect, alone or in combination with one or more of the first through sixth aspects, the one or more parameters include at least one of: a RACH preamble format, a subcarrier spacing, a quantity of cyclic shifts, a target receive power level, a power ramping step value, a measurement threshold value associated with initiating a RACH procedure, a quantity of guard bands, or a size of the guard bands.

In an eighth additional aspect, alone or in combination with one or more of the first through seventh aspects, transmitting the request to modify the RACH configuration includes transmitting, to the second wireless node, the request to modify the RACH configuration.

In a ninth additional aspect, alone or in combination with one or more of the first through eighth aspects, the second wireless node is a child node associated with the first wireless node, and transmitting, to the second wireless node, the request to modify the RACH configuration includes transmitting the request to modify the RACH configuration to an MT unit of the child node.

In a tenth additional aspect, alone or in combination with one or more of the first through ninth aspects, the second wireless node is a parent node associated with the first wireless node, and transmitting, to the second wireless node, the request to modify the RACH configuration includes transmitting the request to modify the RACH configuration to a DU of the parent node.

In an eleventh additional aspect, alone or in combination with one or more of the first through tenth aspects, transmitting, to the second wireless node, the request to modify the RACH configuration includes transmitting the request to modify the RACH configuration via a MAC-CE message.

In a twelfth additional aspect, alone or in combination with one or more of the first through eleventh aspects, transmitting the request to modify the RACH configuration includes transmitting the request to modify the RACH configuration to a CU associated with the first wireless node and the second wireless node.

In a thirteenth additional aspect, alone or in combination with one or more of the first through twelfth aspects, transmitting the request to modify the RACH configuration to the CU includes transmitting the request to modify the RACH configuration via at least one of an RRC message or an F1-AP message.

Although FIG. 13 shows example blocks of process 1300, in some aspects, process 1300 may include additional blocks, fewer blocks, different blocks, or differently arranged blocks than those depicted in FIG. 13. Additionally or alternatively, two or more of the blocks of process 1300 may be performed in parallel.

FIG. 14 is a flowchart illustrating an example process 1400 performed, for example, by a first wireless node that supports negotiating a RACH configuration in an IAB network, in accordance with the present disclosure. Example process 1400 is an example where a wireless node (for example, the second wireless node 1210) performs operations associated with negotiating RACH configurations in an IAB network.

As shown in FIG. 14, in some aspects, process 1400 may include transmitting an indication of a RACH configuration associated with the first wireless node (block 1410). For example, the first wireless node (such as by using transmission component 1606, depicted in FIG. 16) may transmit an indication of a RACH configuration associated with the first wireless node, as described above.

As further shown in FIG. 14, in some aspects, process 1400 may include receiving a request to modify the RACH configuration, where the request to modify the RACH configuration is based at least in part on a configuration of one or more communication links associated with an enhanced duplex mode of at least one of the first wireless node or a second wireless node (block 1420). For example, the first wireless node (such as by using reception component 1602, depicted in FIG. 16) may receive a request to modify the RACH configuration, where the request to modify the RACH configuration is based at least in part on a configuration of one or more communication links associated with an enhanced duplex mode of at least one of the first wireless node or a second wireless node, as described above.

Process 1400 may include additional aspects, such as any single aspect or any combination of aspects described below or in connection with one or more other processes described elsewhere herein.

In a first additional aspect, the second wireless node is a DU of a parent node associated with the first wireless node. In a second additional aspect, alone or in combination with the first aspect, the second wireless node is a DU of a child node associated with the first wireless node.

In a third additional aspect, alone or in combination with one or more of the first and second aspects, transmitting the indication of the RACH configuration includes transmitting the indication of the RACH configuration to an MT unit of the second wireless node.

In a fourth additional aspect, alone or in combination with one or more of the first through third aspects, transmitting the indication of the RACH configuration includes transmitting the indication of the RACH configuration to a CU associated with the first wireless node and the second wireless node.

In a fifth additional aspect, alone or in combination with one or more of the first through fourth aspects, receiving the request to modify the RACH configuration includes receiving a request to modify at least one of: one or more time domain resource allocations associated with the RACH configuration, one or more frequency domain resource allocations associated with the RACH configuration, or one or more parameters associated with the RACH configuration.

In a sixth additional aspect, alone or in combination with one or more of the first through fifth aspects, the one or more parameters include at least one of: a RACH preamble format, a subcarrier spacing, a quantity of cyclic shifts, a target receive power level, a power ramping step value, a measurement threshold value associated with initiating a RACH procedure, a quantity of guard bands, or a size of guard bands.

In a seventh additional aspect, alone or in combination with one or more of the first through sixth aspects, receiving the request to modify the RACH configuration includes receiving, from the second wireless node, the request to modify the RACH configuration.

In an eighth additional aspect, alone or in combination with one or more of the first through seventh aspects, the second wireless node is a child node associated with the first wireless node, and receiving, from the second wireless node, the request to modify the RACH configuration includes receiving the request to modify the RACH configuration from an MT unit of the child node.

In a ninth additional aspect, alone or in combination with one or more of the first through eighth aspects, the second wireless node is a parent node associated with the first wireless node, and receiving, from the second wireless node, the request to modify the RACH configuration includes receiving the request to modify the RACH configuration from a DU of the parent node.

In a tenth additional aspect, alone or in combination with one or more of the first through ninth aspects, receiving, from the second wireless node, the request to modify the RACH configuration includes receiving the request to modify the RACH configuration via a MAC-CE message.

In an eleventh additional aspect, alone or in combination with one or more of the first through tenth aspects, receiving the request to modify the RACH configuration includes receiving the request to modify the RACH configuration from a CU associated with the first wireless node and the second wireless node.

In a twelfth additional aspect, alone or in combination with one or more of the first through eleventh aspects, receiving the request to modify the RACH configuration includes receiving, from a CU, an indication of a modified RACH configuration associated with the request to modify the RACH configuration.

In a thirteenth additional aspect, alone or in combination with one or more of the first through twelfth aspects, the modified RACH configuration indicates at least one of one or more modified resource allocations for the RACH configuration or one or more modified parameters for the RACH configuration.

Although FIG. 14 shows example blocks of process 1400, in some aspects, process 1400 may include additional blocks, fewer blocks, different blocks, or differently arranged blocks than those depicted in FIG. 14. Additionally or alternatively, two or more of the blocks of process 1400 may be performed in parallel.

Figure 15:
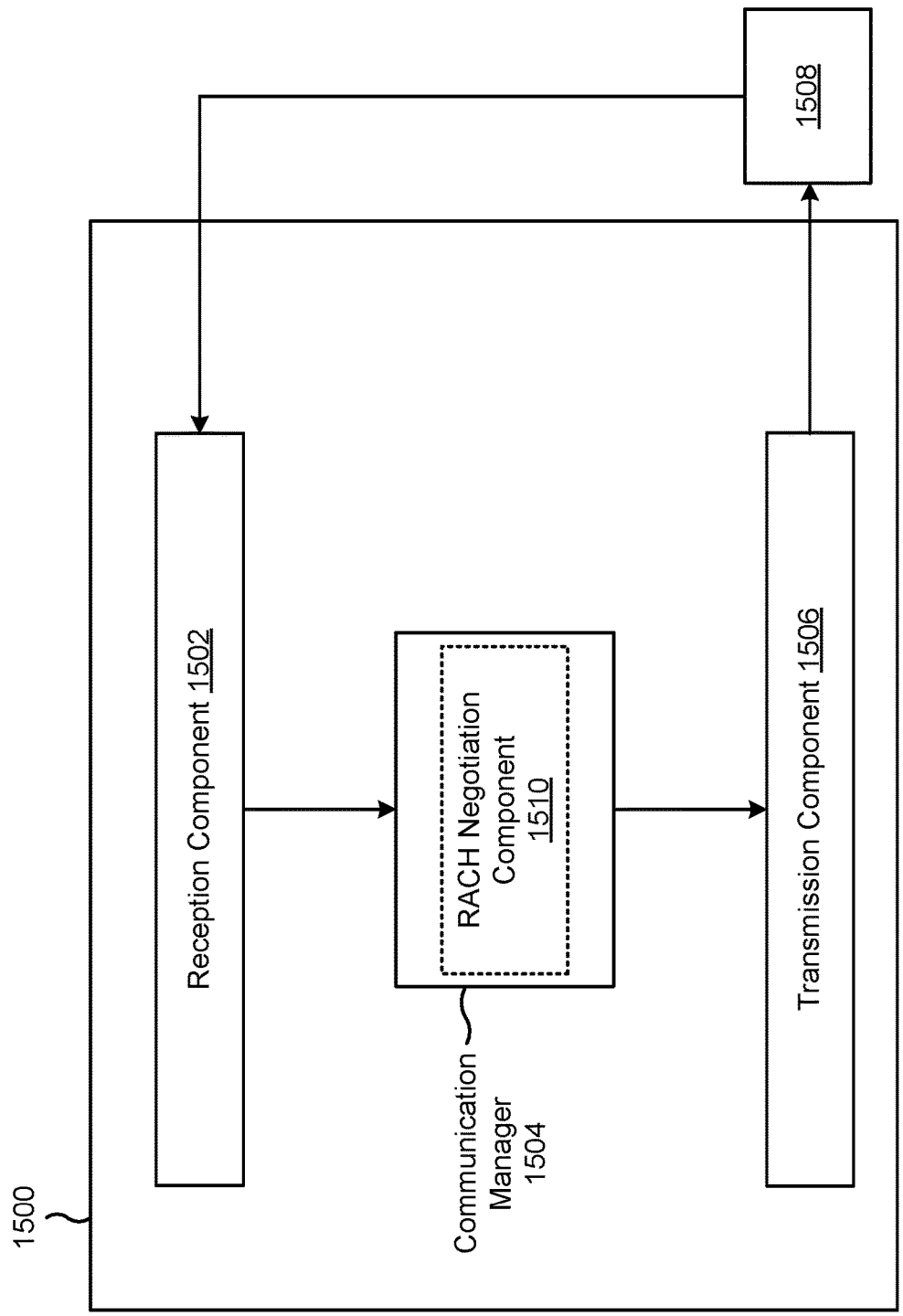
FIGS. 15 and 16 are block diagrams of example apparatuses for wireless communication that support negotiating a RACH configuration in an TAB network, in accordance with the present disclosure.

FIG. 15 is a block diagram of an example apparatus 1500 for wireless communication that supports negotiating a RACH configuration in an IAB network, in accordance with the present disclosure. The apparatus 1500 may be a wireless node, or a wireless node may include the apparatus 1500. In some aspects, the apparatus 1500 includes a reception component 1502, a communication manager 1504, and a transmission component 1506, which may be in communication with one another (for example, via one or more buses). As shown, the apparatus 1500 may communicate with another apparatus 1508 (such as a UE, a base station, or another wireless communication device) using the reception component 1502 and the transmission component 1506.

In some aspects, the apparatus 1500 may be configured to perform one or more operations described herein in connection with FIGS. 9, 10, 11, and 12. Additionally or alternatively, the apparatus 1500 may be configured to perform one or more processes described herein, such as process 1300 of FIG. 13, or a combination thereof. In some aspects, the apparatus 1500 may include one or more components of the wireless node described above in connection with FIG. 2.

The reception component 1502 may receive communications, such as reference signals, control information, data communications, or a combination thereof, from the apparatus 1508. The reception component 1502 may provide received communications to one or more other components of the apparatus 1500, such as the communication manager 1504. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1502 may include one or more antennas, a demodulator, a MIMO detector, a receive processor, a controller/processor, a memory, or a combination thereof, of the wireless node described above in connection with FIG. 2.

The transmission component 1506 may transmit communications, such as reference signals, control information, data communications, or a combination thereof, to the apparatus 1508. In some aspects, the communication manager 1504 may generate communications and may transmit the generated communications to the transmission component 1506 for transmission to the apparatus 1508. In some aspects, the transmission component 1506 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1506 may include one or more antennas, a modulator, a transmit MIMO processor, a transmit processor, a controller/processor, a memory, or a combination thereof, of the wireless node described above in connection with FIG. 2. In some aspects, the transmission component 1506 may be co-located with the reception component 1502 in a transceiver.

The communication manager 1504 may receive or may cause the reception component 1502 to receive an indication of a configuration of one or more communication links associated with an enhanced duplex mode of at least one of the first wireless node or a second wireless node. The communication manager 1504 may receive or may cause the reception component 1502 to receive an indication of a RACH configuration associated with the second wireless node. The communication manager 1504 may transmit or may cause the transmission component 1506 to transmit a request to modify the RACH configuration, where the request to modify the RACH configuration is based at least in part on the configuration of the one or more communication links and the RACH configuration. In some aspects, the communication manager 1504 may perform one or more operations described elsewhere herein as being performed by one or more components of the communication manager 1504.

The communication manager 1504 may include a controller/processor, a memory, a scheduler, a communication unit, or a combination thereof, of the wireless node described above in connection with FIG. 2. In some aspects, the communication manager 1504 includes a set of components, such as a RACH negotiation component 1510, among other examples. Alternatively, the set of components may be separate and distinct from the communication manager 1504. In some aspects, one or more components of the set of components may include or may be implemented within a controller/processor, a memory, a scheduler, a communication unit, or a combination thereof, of the wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive an indication of a configuration of one or more communication links associated with an enhanced duplex mode of at least one of the first wireless node or a second wireless node. The reception component 1502 may receive an indication of a RACH configuration associated with the second wireless node. The transmission component 1506 may transmit a request to modify the RACH configuration, where the request to modify the RACH configuration is based at least in part on the configuration of the one or more communication links and the RACH configuration.

The RACH negotiation component 1510 may determine to request to modify the RACH configuration based at least in part on at least one of: a timing alignment associated with the configuration of the one or more communication links and the RACH configuration, a first beam configuration associated with the configuration of the one or more communication links, a second beam configuration associated with the RACH configuration, a first transmit power configuration associated with the configuration of the one or more communication links, a second transmit power configuration associated with the RACH configuration, or an interference level associated with at least one of the first wireless node or the second wireless node.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
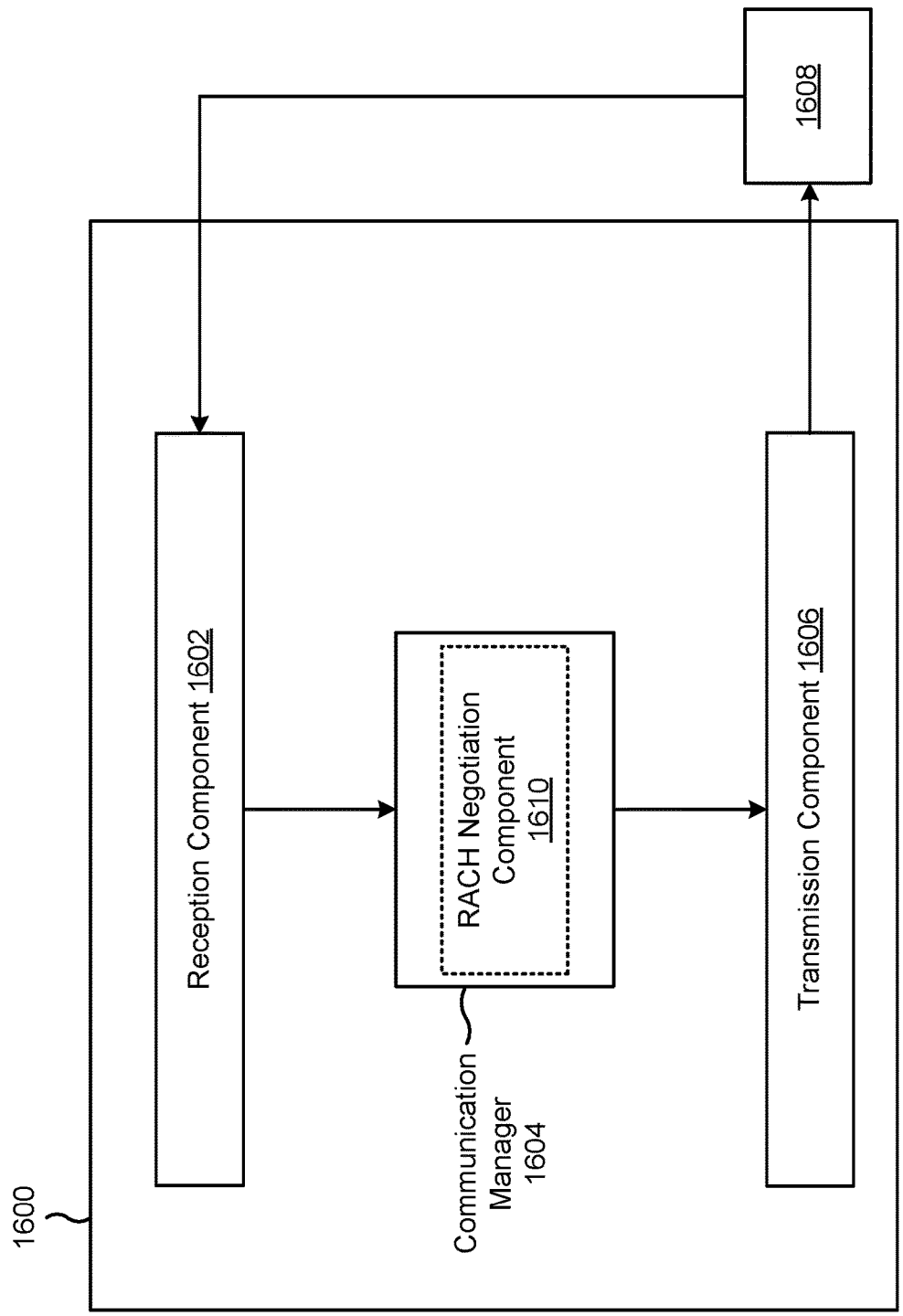

FIG. 16 is a block diagram of an example apparatus 1600 for wireless communication that supports negotiating a RACH configuration in an IAB network, in accordance with the present disclosure. The apparatus 1600 may be a wireless node, or a wireless node may include the apparatus 1600. In some aspects, the apparatus 1600 includes a reception component 1602, a communication manager 1604, and a transmission component 1606, which may be in communication with one another (for example, via one or more buses). As shown, the apparatus 1600 may communicate with another apparatus 1608 (such as a UE, a base station, or another wireless communication device) using the reception component 1602 and the transmission component 1606.

In some aspects, the apparatus 1600 may be configured to perform one or more operations described herein in connection with FIGS. 9, 10, 11, and 12. Additionally or alternatively, the apparatus 1600 may be configured to perform one or more processes described herein, such as process 1400 of FIG. 14, or a combination thereof. In some aspects, the apparatus 1600 may include one or more components of the wireless node described above in connection with FIG. 2.

The reception component 1602 may receive communications, such as reference signals, control information, data communications, or a combination thereof, from the apparatus 1608. The reception component 1602 may provide received communications to one or more other components of the apparatus 1600, such as the communication manager 1604. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1602 may include one or more antennas, a demodulator, a MIMO detector, a receive processor, a controller/processor, a memory, or a combination thereof, of the wireless node described above in connection with FIG. 2.

The transmission component 1606 may transmit communications, such as reference signals, control information, data communications, or a combination thereof, to the apparatus 1608. In some aspects, the communication manager 1604 may generate communications and may transmit the generated communications to the transmission component 1606 for transmission to the apparatus 1608. In some aspects, the transmission component 1606 may perform signal processing on the generated communications (such as filtering, amplification, modulation, digital-to-analog conversion, multiplexing, interleaving, mapping, or encoding, among other examples), and may transmit the processed signals to the apparatus 1608. In some aspects, the transmission component 1606 may include one or more antennas, a modulator, a transmit MIMO processor, a transmit processor, a controller/processor, a memory, or a combination thereof, of the wireless node described above in connection with FIG. 2. In some aspects, the transmission component 1606 may be co-located with the reception component 1602 in a transceiver.

The communication manager 1604 may transmit or may cause the transmission component 1606 to transmit an indication of a RACH configuration associated with the first wireless node. The communication manager 1604 may receive or may cause the reception component 1602 to receive a request to modify the RACH configuration, where the request to modify the RACH configuration is based at least in part on a configuration of one or more communication links associated with an enhanced duplex mode of at least one of the first wireless node or a second wireless node. In some aspects, the communication manager 1604 may perform one or more operations described elsewhere herein as being performed by one or more components of the communication manager 1604.

The communication manager 1604 may include a controller/processor, a memory, a scheduler, a communication unit, or a combination thereof, of the wireless node described above in connection with FIG. 2. In some aspects, the communication manager 1604 includes a set of components, such as a RACH negotiation component 1610, among other examples. Alternatively, the set of components may be separate and distinct from the communication manager 1604. In some aspects, one or more components of the set of components may include or may be implemented within a controller/processor, a memory, a scheduler, a communication unit, or a combination thereof, of the wireless node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1606 may transmit an indication of a RACH configuration associated with the first wireless node. The reception component 1602 may receive a request to modify the RACH configuration, where the request to modify the RACH configuration is based at least in part on a configuration of one or more communication links associated with an enhanced duplex mode of at least one of the first wireless node or a second wireless node.

The RACH negotiation component 1610 may modify the RACH configuration associated with the first wireless node based at least in part on the request to modify the RACH configuration. The RACH negotiation component 1610 may determine whether the RACH configuration associated with the first wireless node can be modified as indicated by the request to modify the RACH configuration.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a first wireless node, comprising: receiving an indication of a configuration of one or more communication links associated with an enhanced duplex mode of at least one of the first wireless node or a second wireless node; receiving an indication of a random access channel (RACH) configuration associated with the second wireless node; and transmitting a request to modify the RACH configuration, wherein the request to modify the RACH configuration is based at least in part on the configuration of the one or more communication links and the RACH configuration.

Aspect 2: The method of Aspect 1, wherein the second wireless node is a distributed unit (DU) of a parent node associated with the first wireless node.

Aspect 3: The method of Aspect 1, wherein the second wireless node is a distributed unit (DU) of a child node associated with the first wireless node.

Aspect 4: The method of any of Aspects 1-2, wherein the second wireless node is a parent node associated with the first wireless node; and wherein receiving the indication of the RACH configuration comprises receiving, from a distributed unit (DU) of the parent node, an indication of a RACH configuration associated with the DU of the parent node.

Aspect 5: The method of any of Aspects 1 and 3, wherein the second wireless node is a child node associated with the first wireless node; and wherein receiving the indication of the RACH configuration comprises receiving, from a central unit (CU), an indication of a RACH configuration of a distributed unit (DU) of the child node.

Aspect 6: The method of any of Aspects 1-5, further comprising determining to request to modify the RACH configuration based at least in part on at least one of: a timing alignment associated with the configuration of the one or more communication links and the RACH configuration, a first beam configuration associated with the configuration of the one or more communication links, a second beam configuration associated with the RACH configuration, a first transmit power configuration associated with the configuration of the one or more communication links, a second transmit power configuration associated with the RACH configuration, or an interference level associated with at least one of the first wireless node or the second wireless node.

Aspect 7: The method of any of Aspects 1-6, wherein transmitting the request to modify the RACH configuration comprises transmitting a request to modify at least one of: one or more time domain resource allocations associated with the RACH configuration, one or more frequency domain resource allocations associated with the RACH configuration, or one or more parameters associated with the RACH configuration.

Aspect 8: The method of Aspect 7, wherein the one or more parameters include at least one of: a RACH preamble format, a subcarrier spacing, a quantity of cyclic shifts, a target receive power level, a power ramping step value, a measurement threshold value associated with initiating a RACH procedure, a quantity of guard bands, or a size of the guard bands.

Aspect 9: The method of any of Aspects 1-8, wherein transmitting the request to modify the RACH configuration comprises transmitting, to the second wireless node, the request to modify the RACH configuration.

Aspect 10: The method of Aspect 9, wherein the second wireless node is a child node associated with the first wireless node; and wherein transmitting, to the second wireless node, the request to modify the RACH configuration comprises transmitting the request to modify the RACH configuration to a mobile termination (MT) unit of the child node.

Aspect 11: The method of Aspect 9, wherein the second wireless node is a parent node associated with the first wireless node; and wherein transmitting, to the second wireless node, the request to modify the RACH configuration comprises transmitting the request to modify the RACH configuration to a distributed unit (DU) of the parent node.

Aspect 12: The method of any of Aspects 9-11, wherein transmitting, to the second wireless node, the request to modify the RACH configuration comprises transmitting the request to modify the RACH configuration via a medium access control (MAC) control element (MAC-CE) message.

Aspect 13: The method of any of Aspects 1-8, wherein transmitting the request to modify the RACH configuration comprises transmitting the request to modify the RACH configuration to a central unit (CU) associated with the first wireless node and the second wireless node.

Aspect 14: The method of Aspect 13, wherein transmitting the request to modify the RACH configuration to the CU comprises transmitting the request to modify the RACH configuration via at least one of a radio resource control (RRC) message or an F1 application protocol (F1-AP) message.

Aspect 15: A method of wireless communication performed by a first wireless node, comprising: transmitting an indication of a random access channel (RACH) configuration associated with the first wireless node; and receiving a request to modify the RACH configuration, wherein the request to modify the RACH configuration is based at least in part on a configuration of one or more communication links associated with an enhanced duplex mode of at least one of the first wireless node or a second wireless node.

Aspect 16: The method of Aspect 15, wherein the second wireless node is a distributed unit (DU) of a parent node associated with the first wireless node.

Aspect 17: The method of Aspect 15, wherein the second wireless node is a distributed unit (DU) of a child node associated with the first wireless node.

Aspect 18: The method of any of Aspects 15-17, wherein transmitting the indication of the RACH configuration comprises transmitting the indication of the RACH configuration to a mobile termination (MT) unit of the second wireless node.

Aspect 19: The method of any of Aspects 15-17, wherein transmitting the indication of the RACH configuration comprises transmitting the indication of the RACH configuration to a central unit (CU) associated with the first wireless node and the second wireless node.

Aspect 20: The method of any of Aspects 15-19, wherein receiving the request to modify the RACH configuration comprises receiving a request to modify at least one of: one or more time domain resource allocations associated with the RACH configuration, one or more frequency domain resource allocations associated with the RACH configuration, or one or more parameters associated with the RACH configuration.

Aspect 21: The method of Aspect 20, wherein the one or more parameters include at least one of: a RACH preamble format, a subcarrier spacing, a quantity of cyclic shifts, a target receive power level, a power ramping step value, a measurement threshold value associated with initiating a RACH procedure, a quantity of guard bands, or a size of guard bands.

Aspect 22: The method of any of Aspects 15-21, wherein receiving the request to modify the RACH configuration comprises receiving, from the second wireless node, the request to modify the RACH configuration.

Aspect 23: The method of Aspect 22, wherein the second wireless node is a child node associated with the first wireless node; and wherein receiving, from the second wireless node, the request to modify the RACH configuration comprises receiving the request to modify the RACH configuration from a mobile termination (MT) unit of the child node.

Aspect 24: The method of Aspect 22, wherein the second wireless node is a parent node associated with the first wireless node; and wherein receiving, from the second wireless node, the request to modify the RACH configuration comprises receiving the request to modify the RACH configuration from a distributed unit (DU) of the parent node.

Aspect 25: The method of any of Aspects 22-24, wherein receiving, from the second wireless node, the request to modify the RACH configuration comprises receiving the request to modify the RACH configuration via a medium access control (MAC) control element (MAC-CE) message.

Aspect 26: The method of any of Aspects 15-21, wherein receiving the request to modify the RACH configuration comprises receiving the request to modify the RACH configuration from a central unit (CU) associated with the first wireless node and the second wireless node.

Aspect 27: The method of any of Aspects 15-21, wherein receiving the request to modify the RACH configuration comprises receiving, from a central unit (CU), an indication of a modified RACH configuration associated with the request to modify the RACH configuration.

Aspect 28: The method of Aspect 27, wherein the modified RACH configuration indicates at least one of one or more modified resource allocations for the RACH configuration or one or more modified parameters for the RACH configuration.

Aspect 29: An apparatus for wireless communication at a device, comprising a processor; memory coupled with the processor; and instructions stored in the memory and executable by the processor to cause the apparatus to perform the method of one or more Aspects of Aspects 1-14.

Aspect 30: A device for wireless communication, comprising a memory and one or more processors coupled to the memory, the memory and the one or more processors configured to perform the method of one or more Aspects of Aspects 1-14.

Aspect 31: An apparatus for wireless communication, comprising at least one means for performing the method of one or more Aspects of Aspects 1-14.

Aspect 32: A non-transitory computer-readable medium storing code for wireless communication, the code comprising instructions executable by a processor to perform the method of one or more Aspects of Aspects 1-14.

Aspect 33: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 34: An apparatus for wireless communication at a device, comprising a processor; memory coupled with the processor; and instructions stored in the memory and executable by the processor to cause the apparatus to perform the method of one or more Aspects of Aspects 15-28.

Aspect 35: A device for wireless communication, comprising a memory and one or more processors coupled to the memory, the memory and the one or more processors configured to perform the method of one or more Aspects of Aspects 15-28.

Aspect 36: An apparatus for wireless communication, comprising at least one means for performing the method of one or more Aspects of Aspects 15-28.

Aspect 37: A non-transitory computer-readable medium storing code for wireless communication, the code comprising instructions executable by a processor to perform the method of one or more Aspects of Aspects 15-28.

Aspect 38: A non-transitory computer-readable medium storing a set of instructions for wireless communication, the set of instructions comprising one or more instructions that, when executed by one or more processors of a device, cause the device to perform the method of one or more Aspects of Aspects 15-28.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A first wireless node for wireless communication, comprising:
    at least one processor; and
    at least one memory communicatively coupled with the at least one processor and storing processor-readable code, that when executed by the at least one processor, is configured to cause the first wireless node to:
        receive, at the first wireless node, an indication of a configuration of one or more communication links associated with an enhanced duplex mode of at least one of the first wireless node or a second wireless node;
        receive, at the first wireless node, an indication of a random access channel (RACH) configuration associated with the second wireless node, the RACH configuration corresponding to a communication link of the one or more communication links associated with the enhanced duplex mode; and
        transmit a request to modify the RACH configuration, wherein the request to modify the RACH configuration is based at least in part on the configuration of the one or more communication links and the RACH configuration.

2. The first wireless node of claim 1, wherein the second wireless node is a parent node associated with the first wireless node; and
    wherein the processor-readable code, when executed by the at least one processor to receive the indication of the RACH configuration, is further configured to cause the first wireless node to receive, from a distributed unit (DU) of the parent node, an indication of a RACH configuration associated with the DU of the parent node.

3. The first wireless node of claim 1, wherein the second wireless node is a child node associated with the first wireless node; and
    wherein the processor-readable code, when executed by the at least one processor to receive the indication of the RACH configuration, is further configured to cause the first wireless node to receive, from a central unit (CU), an indication of a RACH configuration of a distributed unit (DU) of the child node.

4. The first wireless node of claim 1, wherein the processor-readable code, when executed by the at least one processor, is further configured to cause the first wireless node to determine to request to modify the RACH configuration based at least in part on at least one of:
  a timing alignment associated with the configuration of the one or more communication links and the RACH configuration,
  a first beam configuration associated with the configuration of the one or more communication links,
  a second beam configuration associated with the RACH configuration,
  a first transmit power configuration associated with the configuration of the one or more communication links,
  a second transmit power configuration associated with the RACH configuration, or
  an interference level associated with at least one of the first wireless node or the second wireless node.

5. The first wireless node of claim 1, wherein the processor-readable code, when executed by the at least one processor to transmit the request to modify the RACH configuration, is further configured to cause the first wireless node to transmit a request to modify at least one of:
  one or more time domain resource allocations associated with the RACH configuration,
  one or more frequency domain resource allocations associated with the RACH configuration, or
  one or more parameters associated with the RACH configuration.

6. The first wireless node of claim 5, wherein the one or more parameters include at least one of:
  a RACH preamble format,
  a subcarrier spacing,
  a quantity of cyclic shifts,
  a target receive power level,
  a power ramping step value,
  a measurement threshold value associated with initiating a RACH procedure,
  a quantity of guard bands, or
  a size of the guard bands.

7. The first wireless node of claim 1, wherein the processor-readable code, when executed by the at least one processor to transmit the request to modify the RACH configuration, is further configured to cause the first wireless node to transmit, to the second wireless node, the request to modify the RACH configuration.

8. The first wireless node of claim 7, wherein the second wireless node is a child node associated with the first wireless node; and
  wherein the processor-readable code, when executed by the at least one processor to transmit the request to modify the RACH configuration, is further configured to cause the first wireless node to transmit the request to modify the RACH configuration to a mobile termination (MT) unit of the child node.

9. The first wireless node of claim 7, wherein the second wireless node is a parent node associated with the first wireless node; and
  wherein the processor-readable code, when executed by the at least one processor to transmit the request to modify the RACH configuration, is further configured to cause the first wireless node to transmit the request to modify the RACH configuration to a distributed unit (DU) of the parent node.

10. The first wireless node of claim 7, wherein the processor-readable code, when executed by the at least one processor to transmit the request to modify the RACH configuration, is further configured to cause the first wireless node to transmit the request to modify the RACH configuration via a medium access control (MAC) control element (MAC-CE) message.

11. The first wireless node of claim 1, wherein the processor-readable code, when executed by the at least one processor to transmit the request to modify the RACH configuration, is further configured to cause the first wireless node to transmit the request to modify the RACH configuration to a central unit (CU) associated with the first wireless node and the second wireless node.

12. The first wireless node of claim 11, wherein the processor-readable code, when executed by the at least one processor to transmit the request to modify the RACH configuration to the CU, is further configured to cause the first wireless node to transmit the request to modify the RACH configuration via at least one of a radio resource control (RRC) message or an F1 application protocol (F1-AP) message.

13. A first wireless node for wireless communication, comprising:
  at least one processor; and
  at least one memory communicatively coupled with the at least one processor and storing processor-readable code that, when executed by the at least one processor, is configured to cause the first wireless node to:
    transmit an indication of a random access channel (RACH) configuration associated with the first wireless node; and
    receive a request to modify the RACH configuration, wherein the request to modify the RACH configuration is based at least in part on a configuration of one or more communication links associated with an enhanced duplex mode of at least one of the first wireless node or a second wireless node, the RACH configuration corresponding to a communication link of the one or more communication links associated with the enhanced duplex mode.

14. The first wireless node of claim 13, wherein the processor-readable code, when executed by the at least one processor to receive the request to modify the RACH configuration, is further configured to cause the first wireless node to receive a request to modify at least one of:
  one or more time domain resource allocations associated with the RACH configuration,
  one or more frequency domain resource allocations associated with the RACH configuration, or
  one or more parameters associated with the RACH configuration.

15. The first wireless node of claim 13, wherein the processor-readable code, when executed by the at least one processor to receive the request to modify the RACH configuration, is further configured to cause the first wireless node to receive, from the second wireless node or a central unit (CU), the request to modify the RACH configuration.

16. A method of wireless communication performed by a first wireless node, comprising:
  receiving, at the first wireless node, an indication of a configuration of one or more communication links associated with an enhanced duplex mode of at least one of the first wireless node or a second wireless node;
  receiving, at the first wireless node, an indication of a random access channel (RACH) configuration associated with the second wireless node, the RACH configuration corresponding to a communication link of the one or more communication links associated with the enhanced duplex mode; and transmitting a request to modify the RACH configuration, wherein the request to modify the RACH configuration is based at least in part on the configuration of the one or more communication links and the RACH configuration.

17. The method of claim 16, wherein the second wireless node is a parent node associated with the first wireless node; and
wherein receiving the indication of the RACH configuration comprises receiving, from a distributed unit (DU) of the parent node, an indication of a RACH configuration associated with the DU of the parent node.

18. The method of claim 16, wherein the second wireless node is a child node associated with the first wireless node; and
wherein receiving the indication of the RACH configuration comprises receiving, from a central unit (CU), an indication of a RACH configuration of a distributed unit (DU) of the child node.

19. The method of claim 16, further comprising determining to request to modify the RACH configuration based at least in part on at least one of:
a timing alignment associated with the configuration of the one or more communication links and the RACH configuration,
a first beam configuration associated with the configuration of the one or more communication links,
a second beam configuration associated with the RACH configuration,
a first transmit power configuration associated with the configuration of the one or more communication links,
a second transmit power configuration associated with the RACH configuration, or
an interference level associated with at least one of the first wireless node or the second wireless node.

20. The method of claim 16, wherein transmitting the request to modify the RACH configuration comprises transmitting a request to modify at least one of:
one or more time domain resource allocations associated with the RACH configuration,
one or more frequency domain resource allocations associated with the RACH configuration, or
one or more parameters associated with the RACH configuration.

21. The method of claim 20, wherein the one or more parameters include at least one of:
a RACH preamble format,
a subcarrier spacing,
a quantity of cyclic shifts,
a target receive power level,
a power ramping step value,
a measurement threshold value associated with initiating a RACH procedure,
a quantity of guard bands, or
a size of the guard bands.

22. The method of claim 16, wherein transmitting the request to modify the RACH configuration comprises transmitting, to the second wireless node, the request to modify the RACH configuration.

23. The method of claim 22, wherein the second wireless node is a child node associated with the first wireless node; and
wherein transmitting, to the second wireless node, the request to modify the RACH configuration comprises transmitting the request to modify the RACH configuration to a mobile termination (MT) unit of the child node.

24. The method of claim 22, wherein the second wireless node is a parent node associated with the first wireless node; and
wherein transmitting, to the second wireless node, the request to modify the RACH configuration comprises transmitting the request to modify the RACH configuration to a distributed unit (DU) of the parent node.

25. The method of claim 22, wherein transmitting, to the second wireless node, the request to modify the RACH configuration comprises transmitting the request to modify the RACH configuration via a medium access control (MAC) control element (MAC-CE) message.

26. The method of claim 16, wherein transmitting the request to modify the RACH configuration comprises transmitting the request to modify the RACH configuration to a central unit (CU) associated with the first wireless node and the second wireless node.

27. The method of claim 26, wherein transmitting the request to modify the RACH configuration to the CU comprises transmitting the request to modify the RACH configuration via at least one of a radio resource control (RRC) message or an F1 application protocol (F1-AP) message.

28. A method of wireless communication performed by a first wireless node, comprising:
transmitting an indication of a random access channel (RACH) configuration associated with the first wireless node; and
receiving a request to modify the RACH configuration, wherein the request to modify the RACH configuration is based at least in part on a configuration of one or more communication links associated with an enhanced duplex mode of at least one of the first wireless node or a second wireless node, the RACH configuration corresponding to a communication link of the one or more communication links associated with the enhanced duplex mode.

29. The method of claim 28, wherein receiving the request to modify the RACH configuration comprises receiving a request to modify at least one of:
one or more time domain resource allocations associated with the RACH configuration,
one or more frequency domain resource allocations associated with the RACH configuration, or
one or more parameters associated with the RACH configuration.

30. The method of claim 28, wherein receiving the request to modify the RACH configuration comprises receiving, from the second wireless node or a central unit (CU), the request to modify the RACH configuration.

* * * * *